Figure 1:
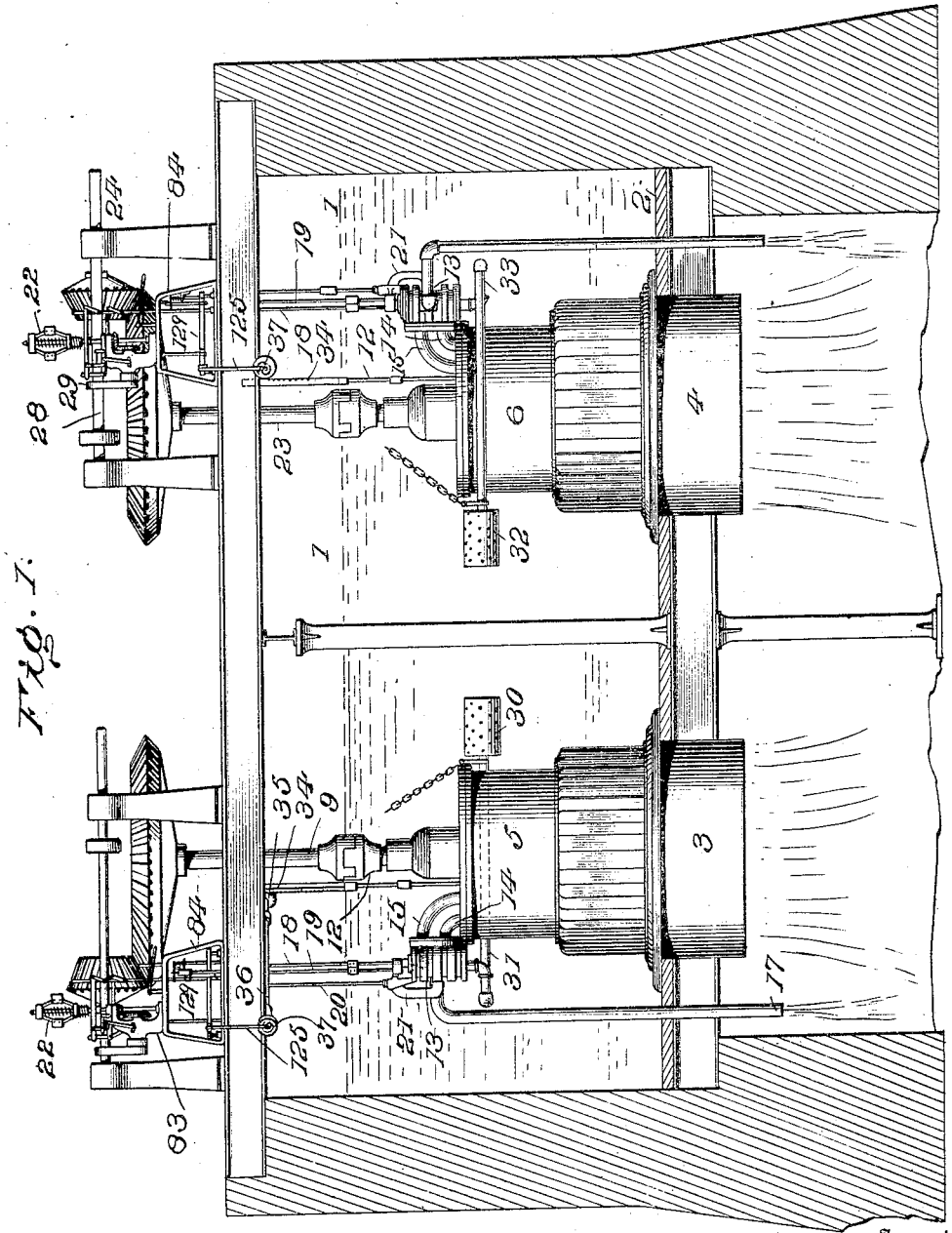

No. 852,779. PATENTED MAY 7, 1907.
F. ELLICOTT.
GOVERNOR FOR PRIME MOTORS.
APPLICATION FILED AUG. 22, 1906.

17 SHEETS—SHEET 1.

Inventor
Francis Ellicott

Witnesses

By Stewart & Stewart
Attorneys

No. 852,779. PATENTED MAY 7, 1907.
F. ELLICOTT.
GOVERNOR FOR PRIME MOTORS.
APPLICATION FILED AUG. 22, 1906.

17 SHEETS—SHEET 2.

Witnesses
Jn. Sm—
W. A. Williams.

Inventor
Francis Ellicott
By Steward & Steward
Attorneys

No. 852,779. PATENTED MAY 7, 1907.
F. ELLICOTT.
GOVERNOR FOR PRIME MOTORS.
APPLICATION FILED AUG. 22, 1906.

17 SHEETS—SHEET 3.

Witnesses
Inventor
Francis Ellicott
By Stewart & Stewart

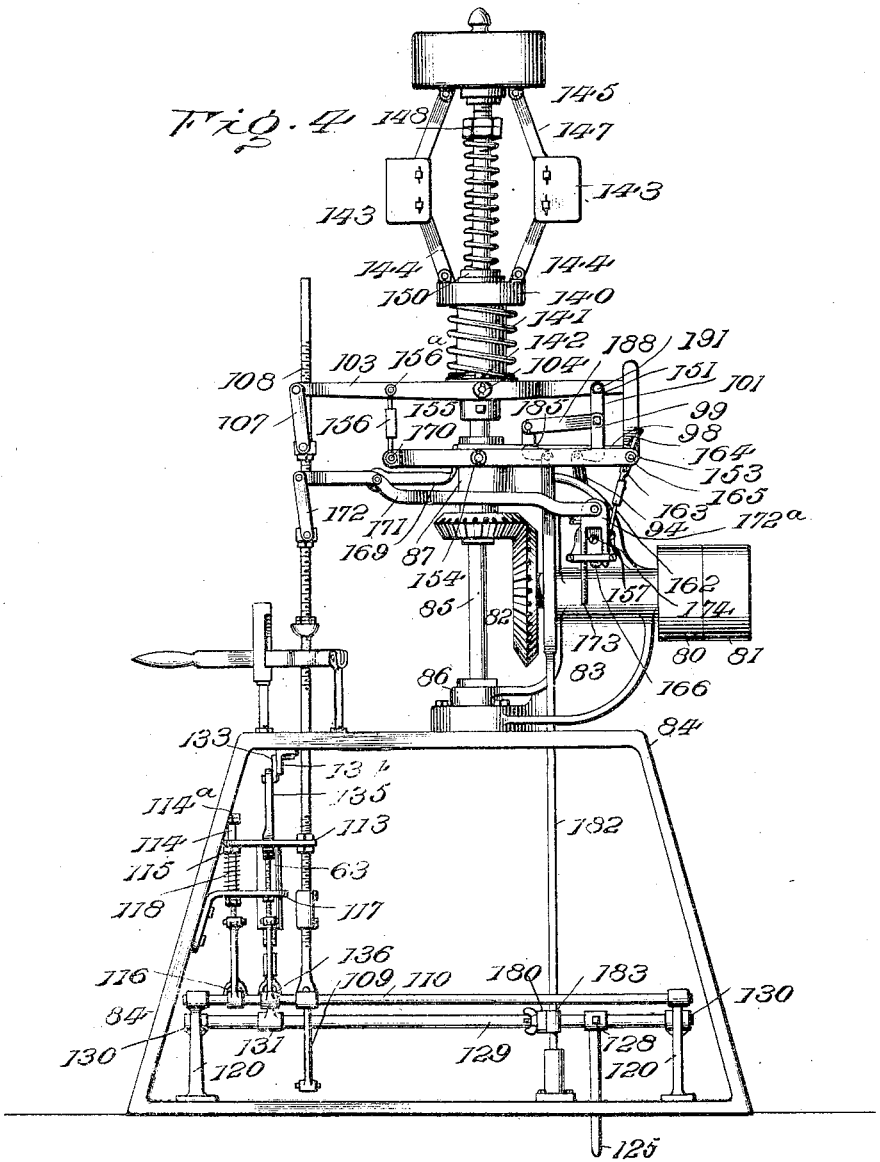

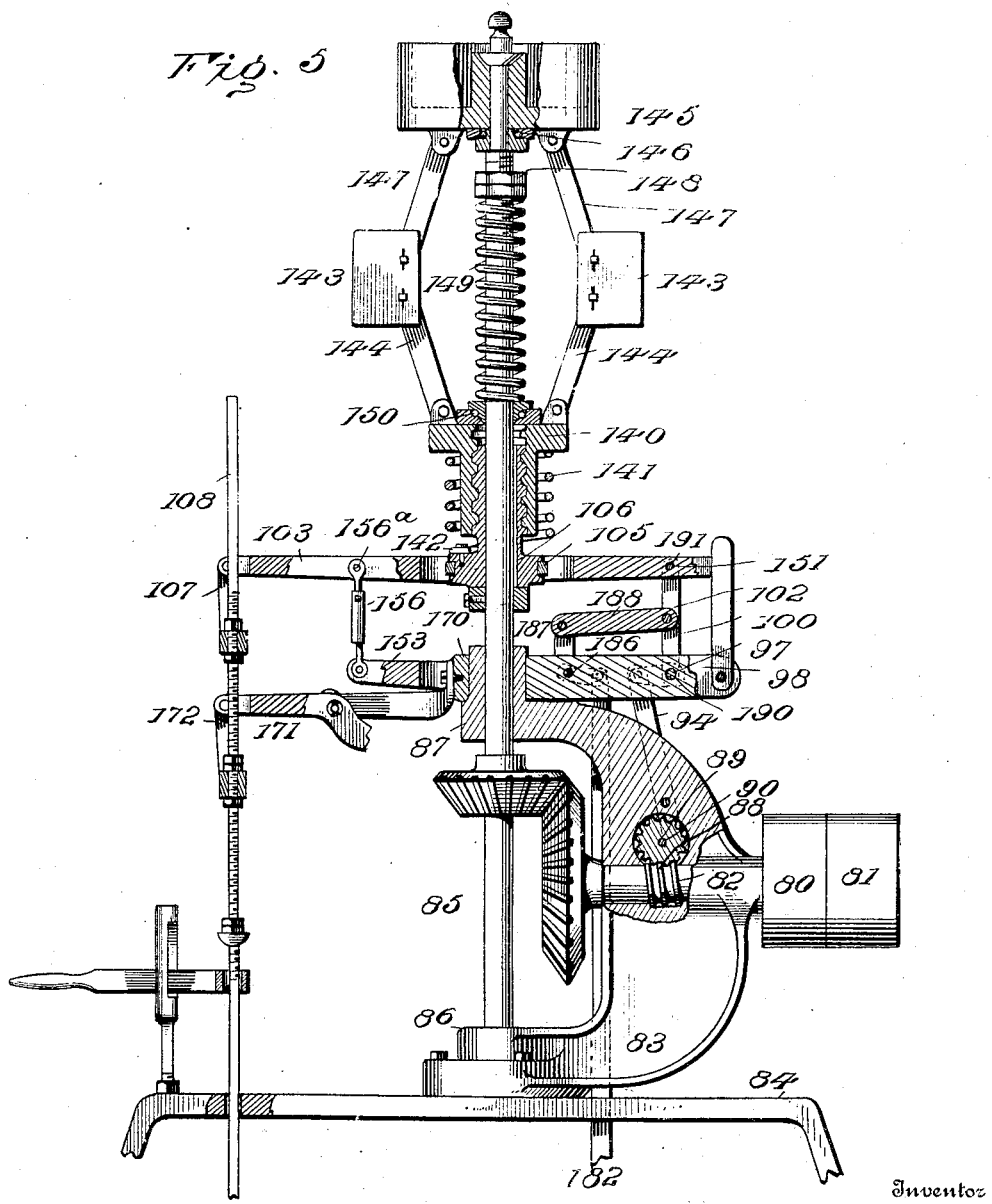

No. 852,779. PATENTED MAY 7, 1907.
F. ELLICOTT.
GOVERNOR FOR PRIME MOTORS.
APPLICATION FILED AUG. 22, 1906.
17 SHEETS—SHEET 6.
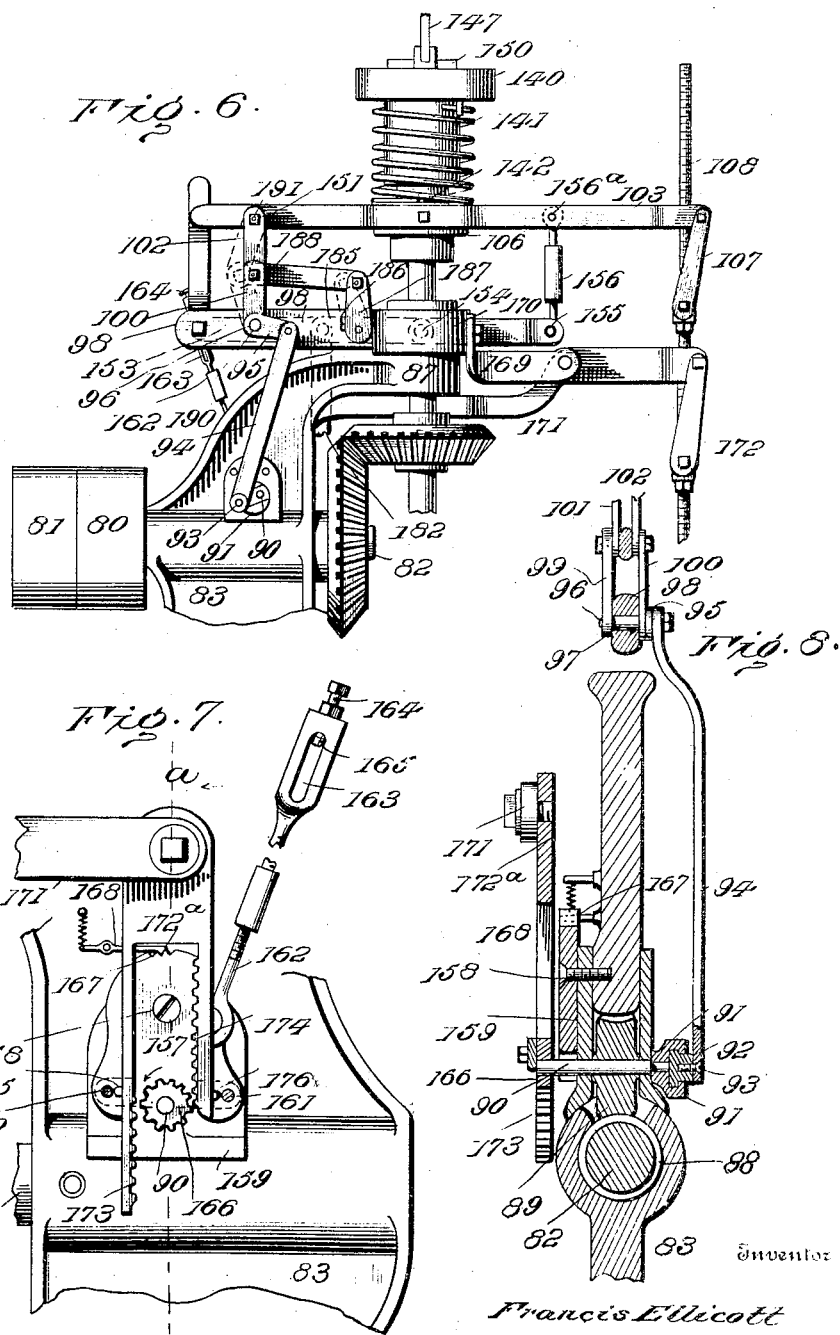
Witnesses
W. A. Williams
Inventor
Francis Ellicott
By Stewart & Stewart
Attorneys No. 852,779. PATENTED MAY 7, 1907.
F. ELLICOTT.
GOVERNOR FOR PRIME MOTORS.
APPLICATION FILED AUG. 22, 1906.
17 SHEETS—SHEET 7.
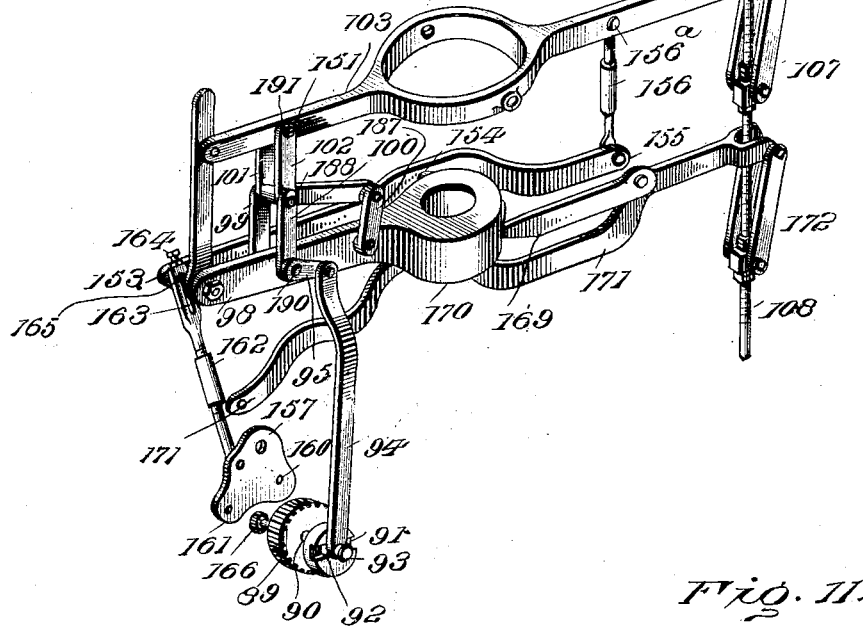

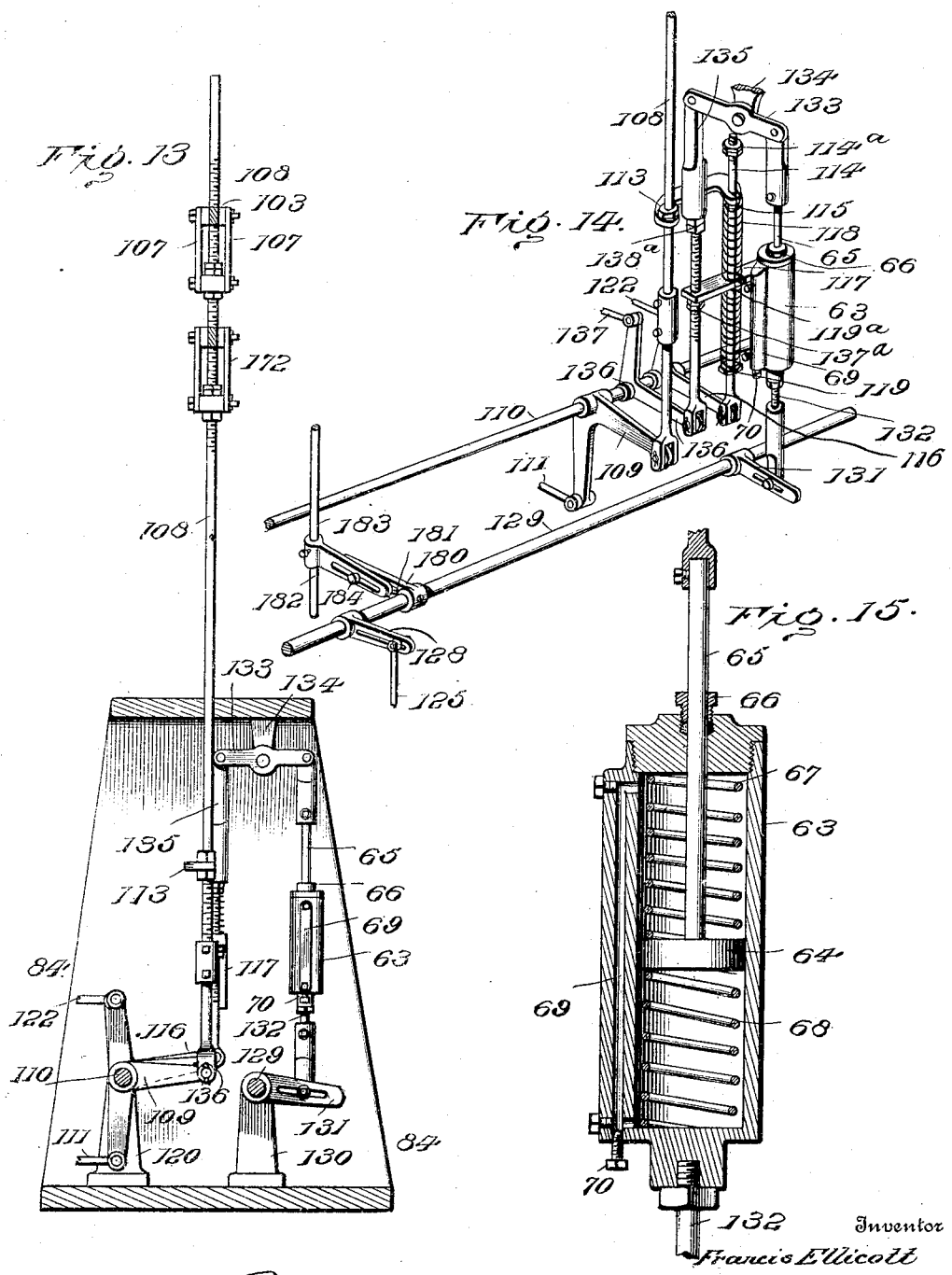

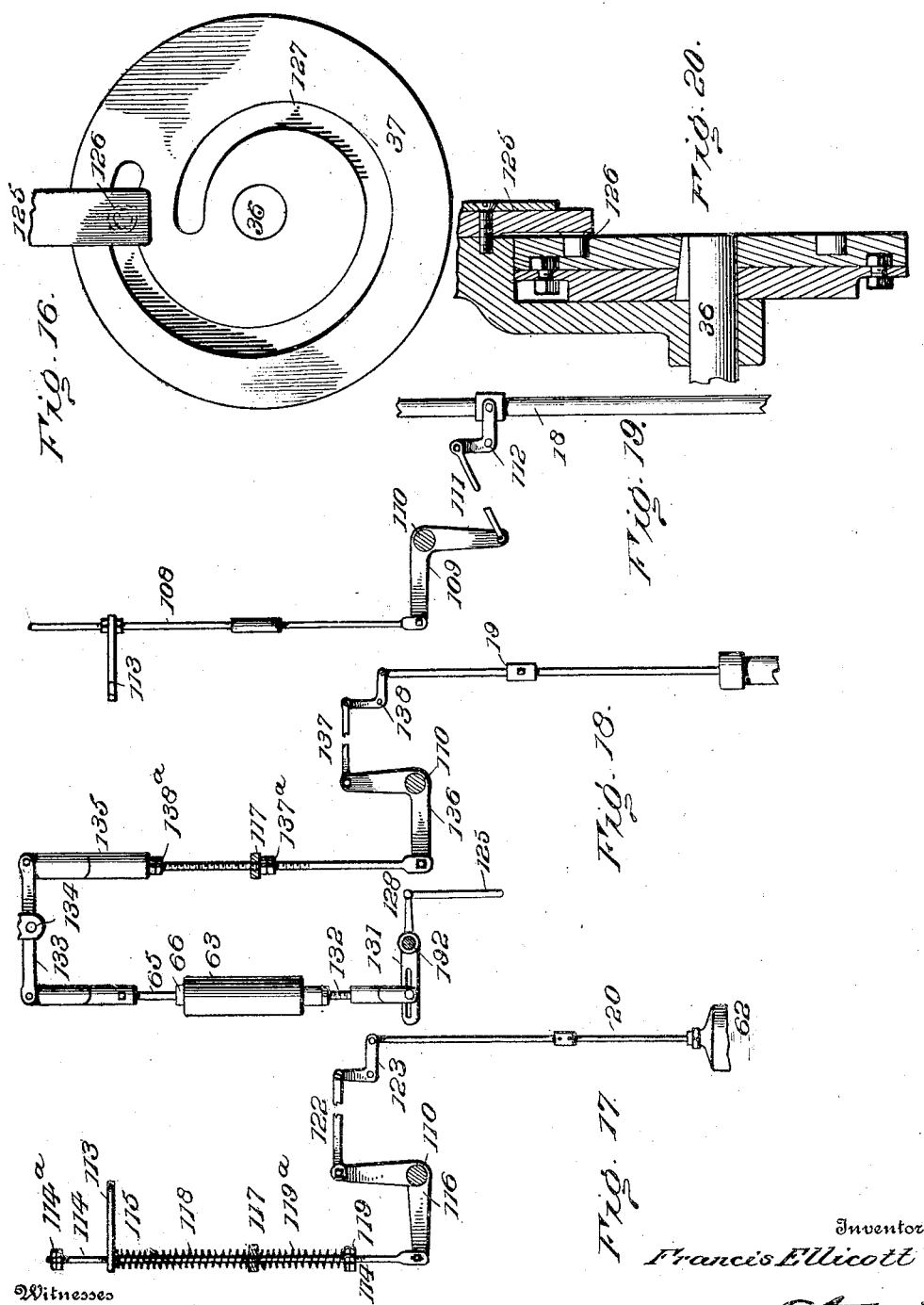

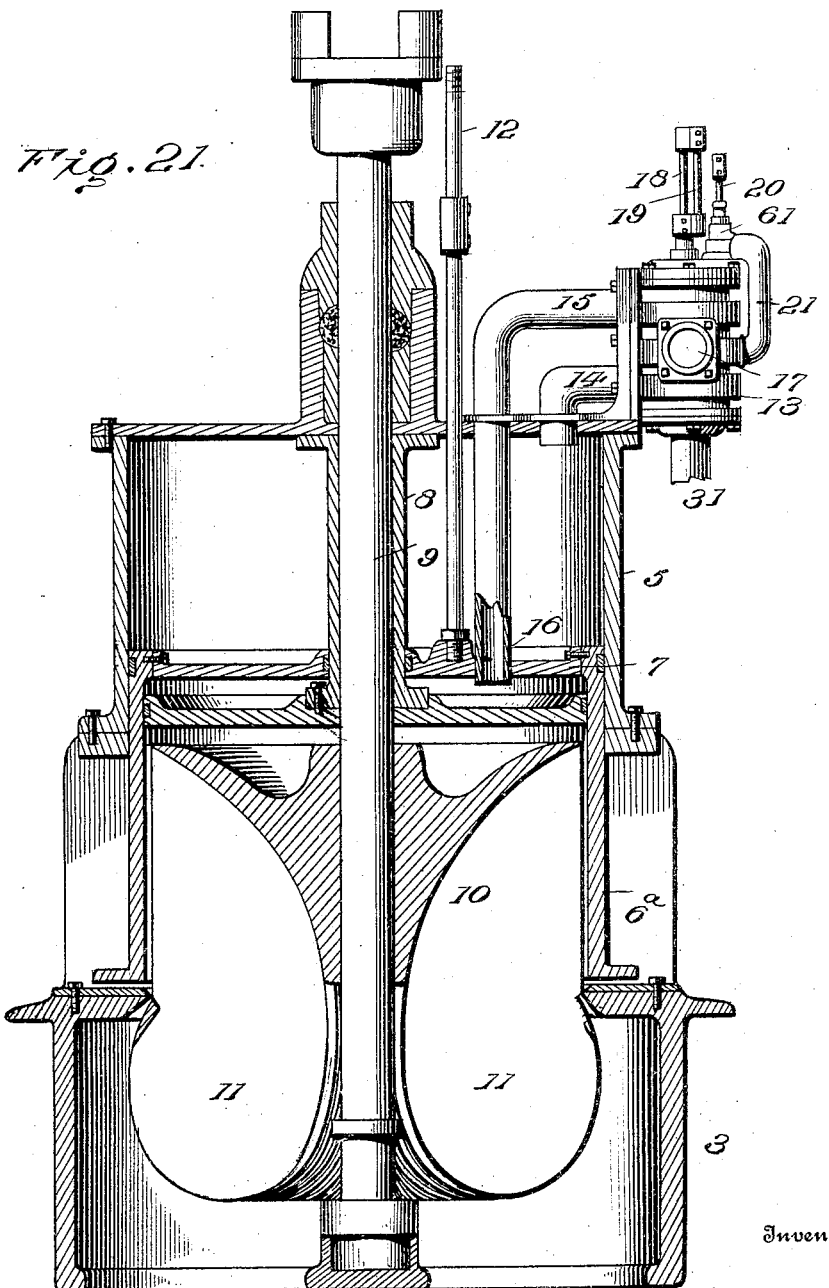

No. 852,779. PATENTED MAY 7, 1907.
F. ELLICOTT.
GOVERNOR FOR PRIME MOTORS.
APPLICATION FILED AUG. 22, 1906.
17 SHEETS—SHEET 11.
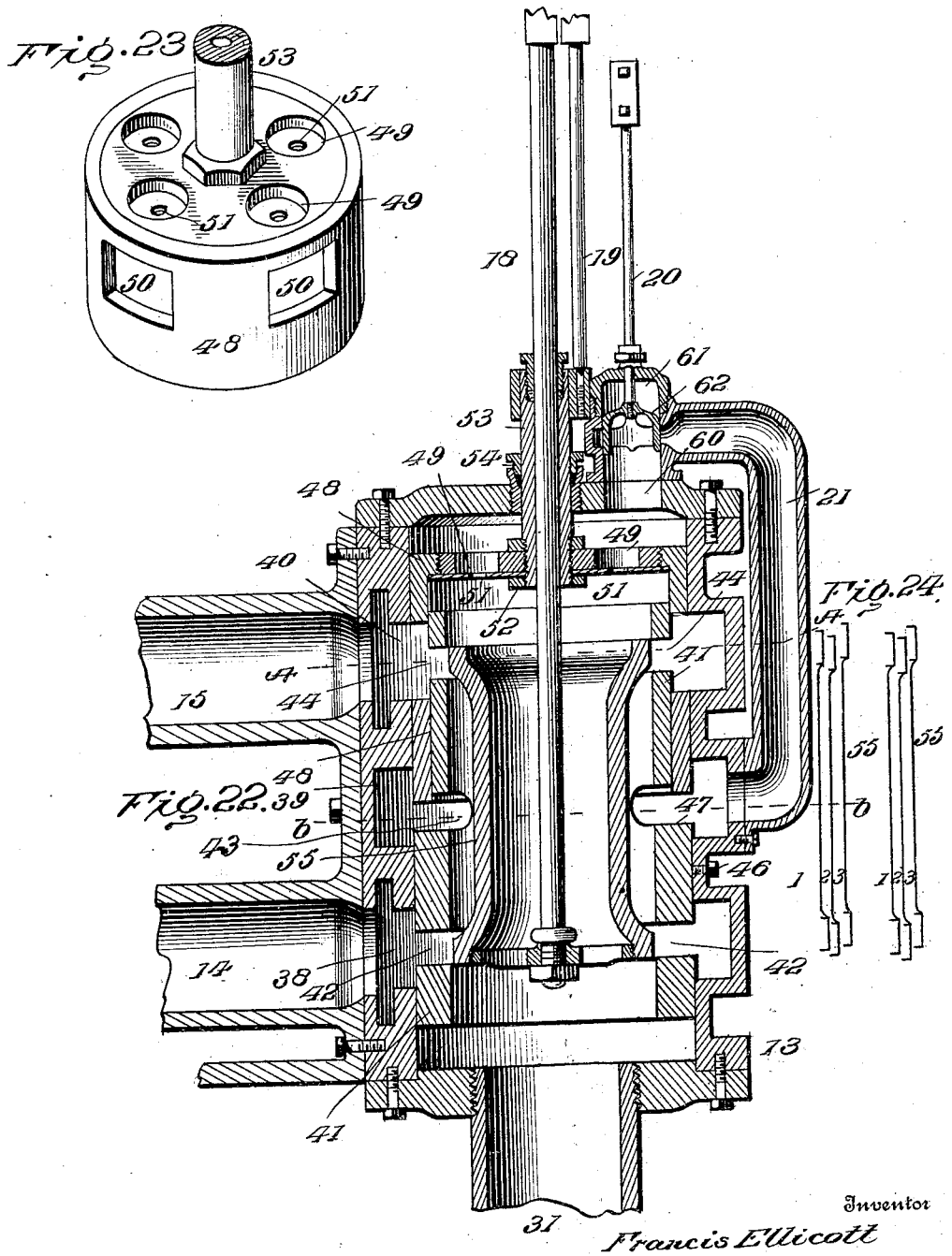
Inventor
Francis Ellicott
By Stewart & Stewart
Attorneys
Witnesses No. 852,779. PATENTED MAY 7, 1907.
F. ELLICOTT.
GOVERNOR FOR PRIME MOTORS.
APPLICATION FILED AUG. 22, 1906.
17 SHEETS—SHEET 12.
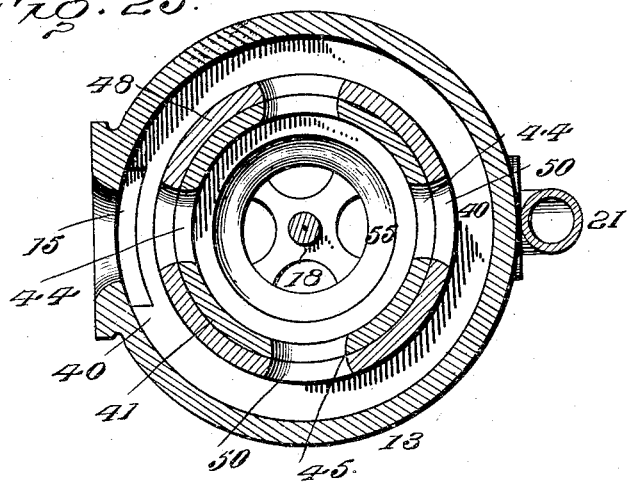
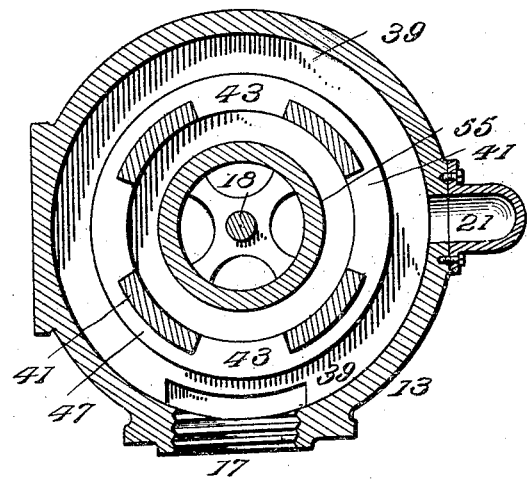
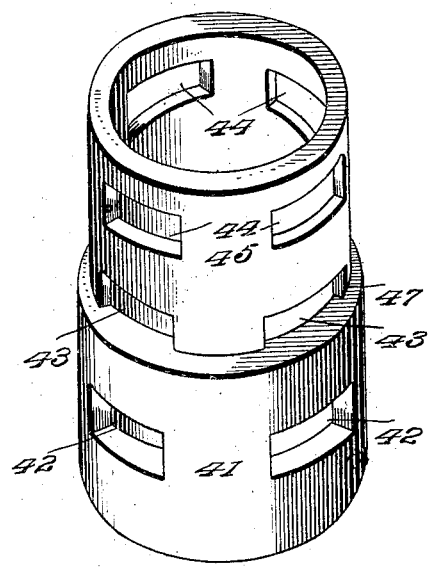
Inventor
Francis Ellicott
Witnesses
W. A. Williams
By Stewart & Stewart
Attorneys

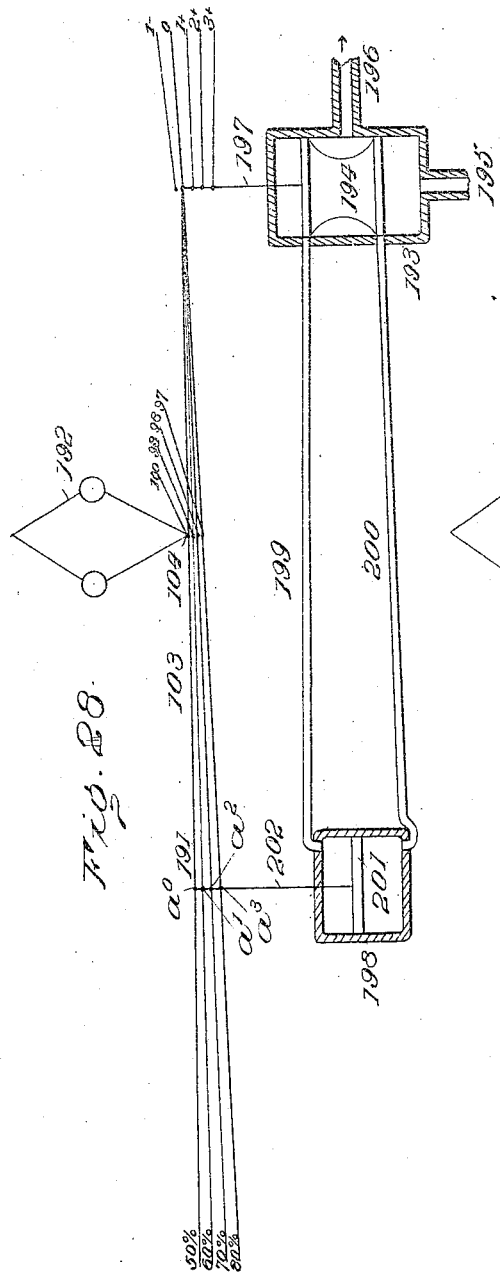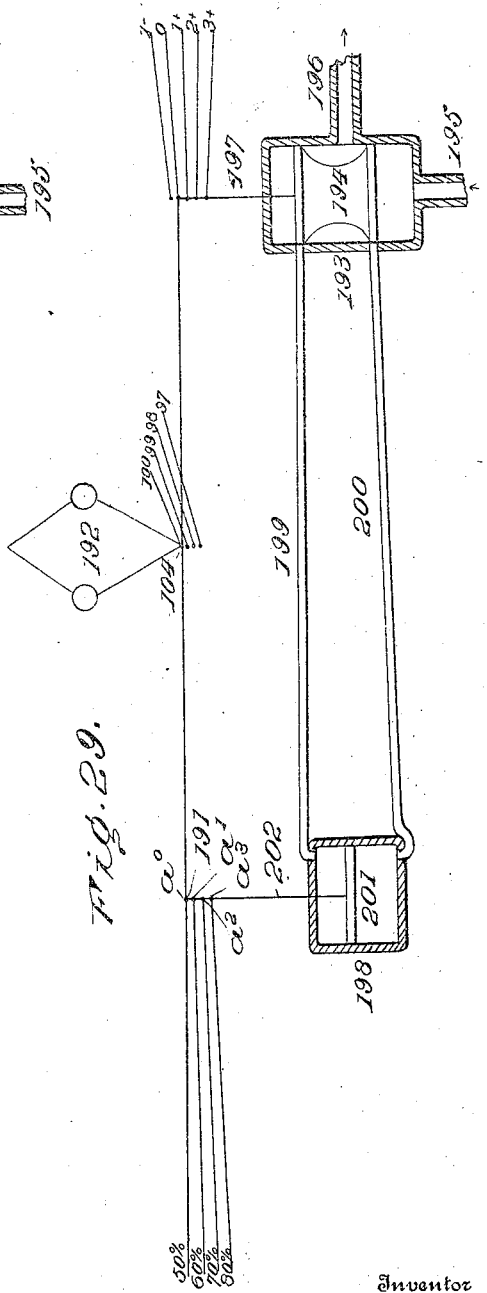

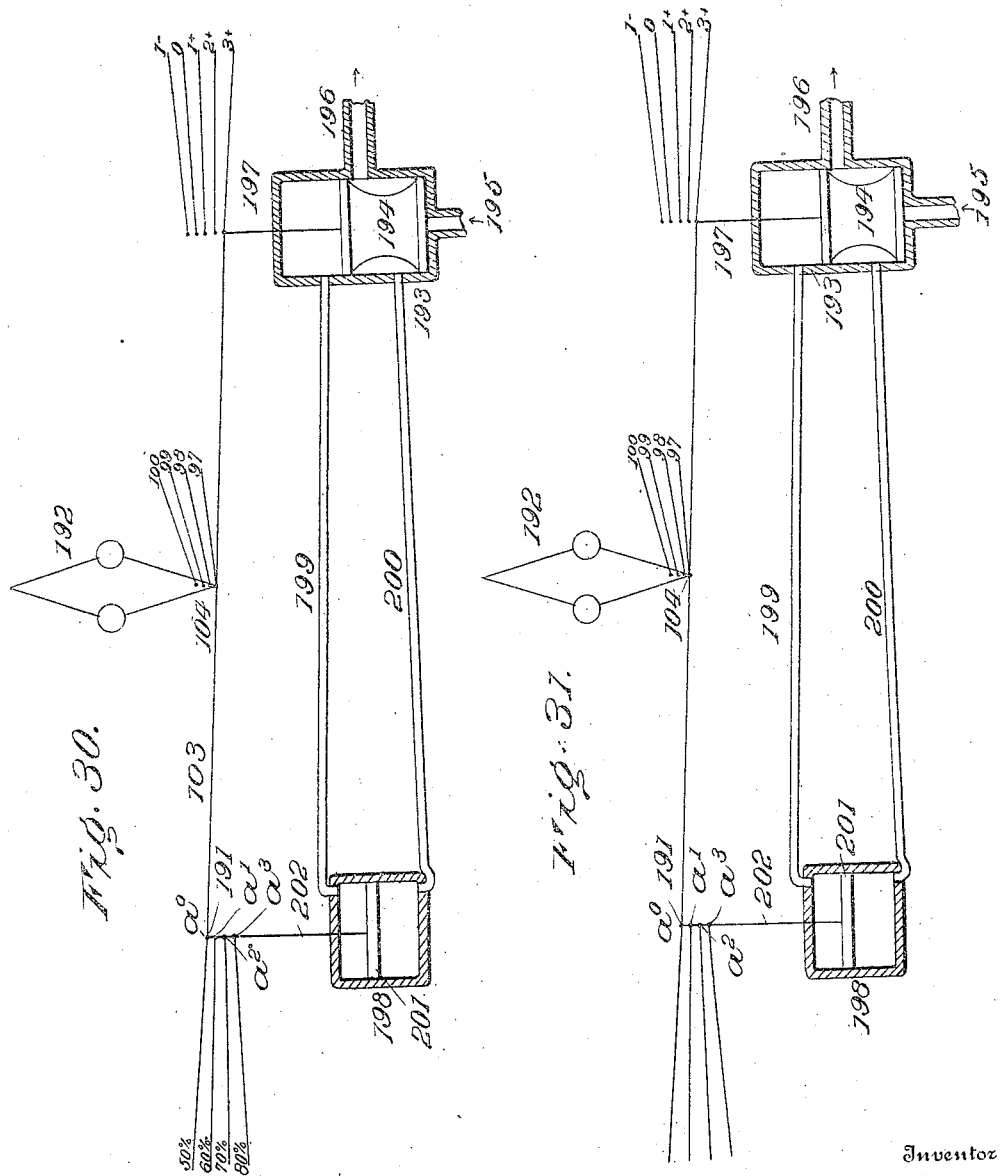

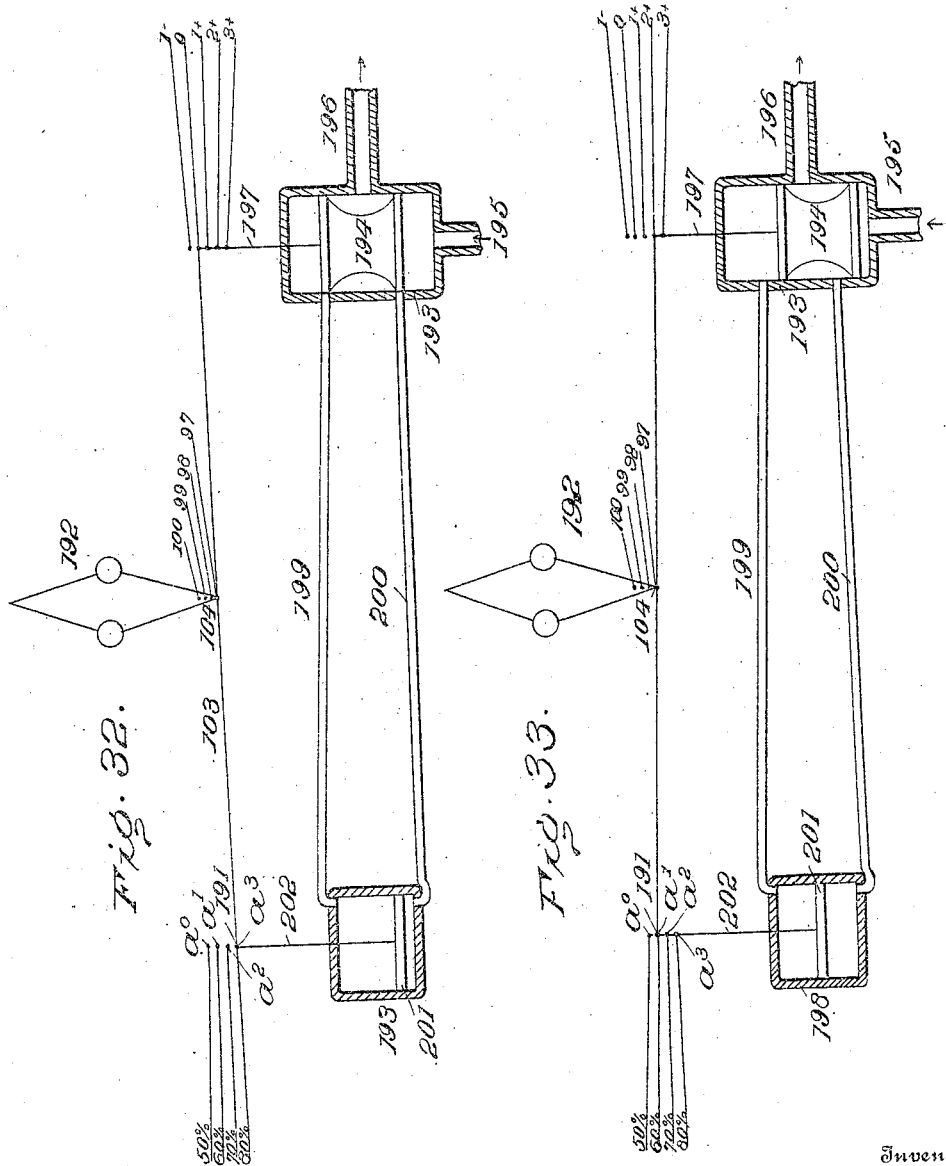

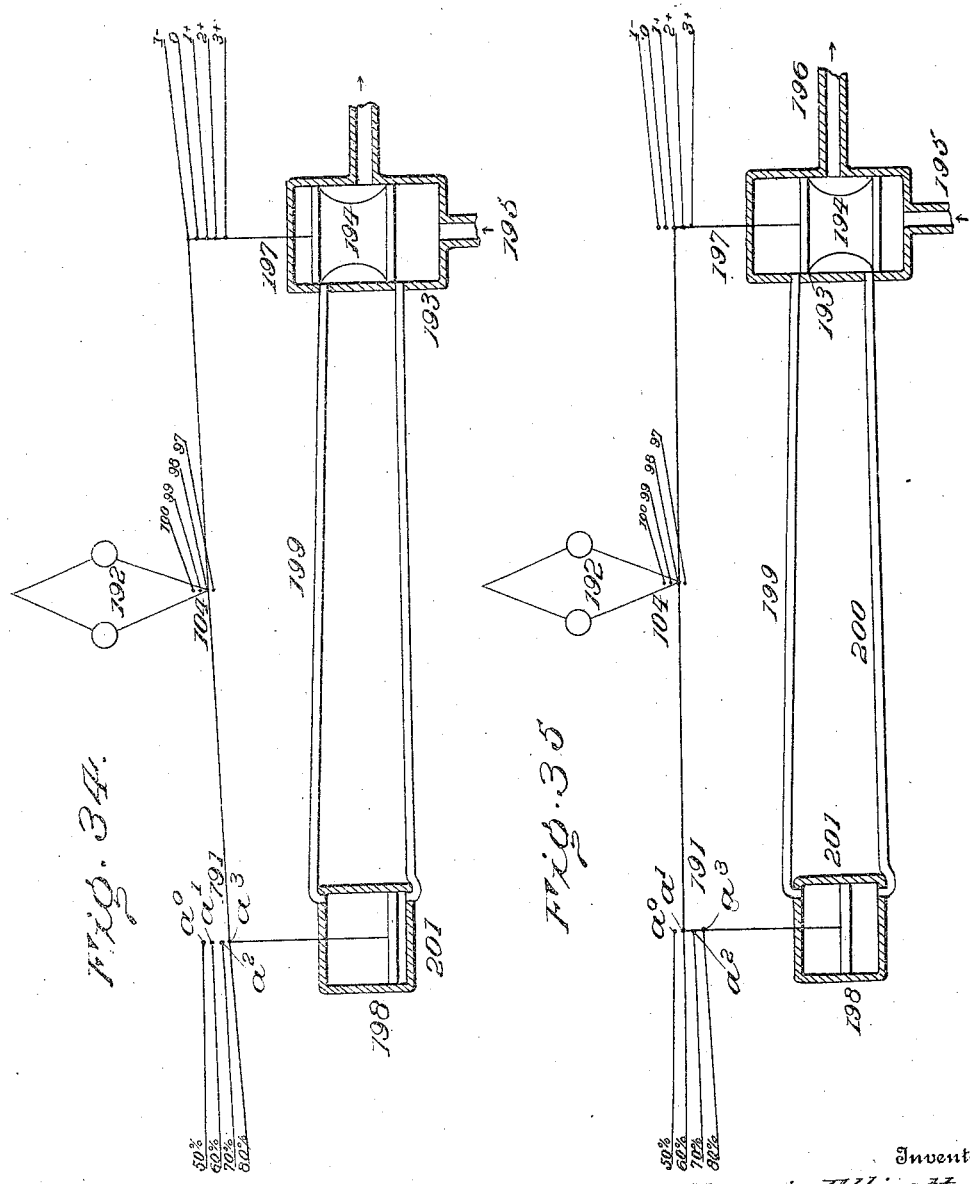

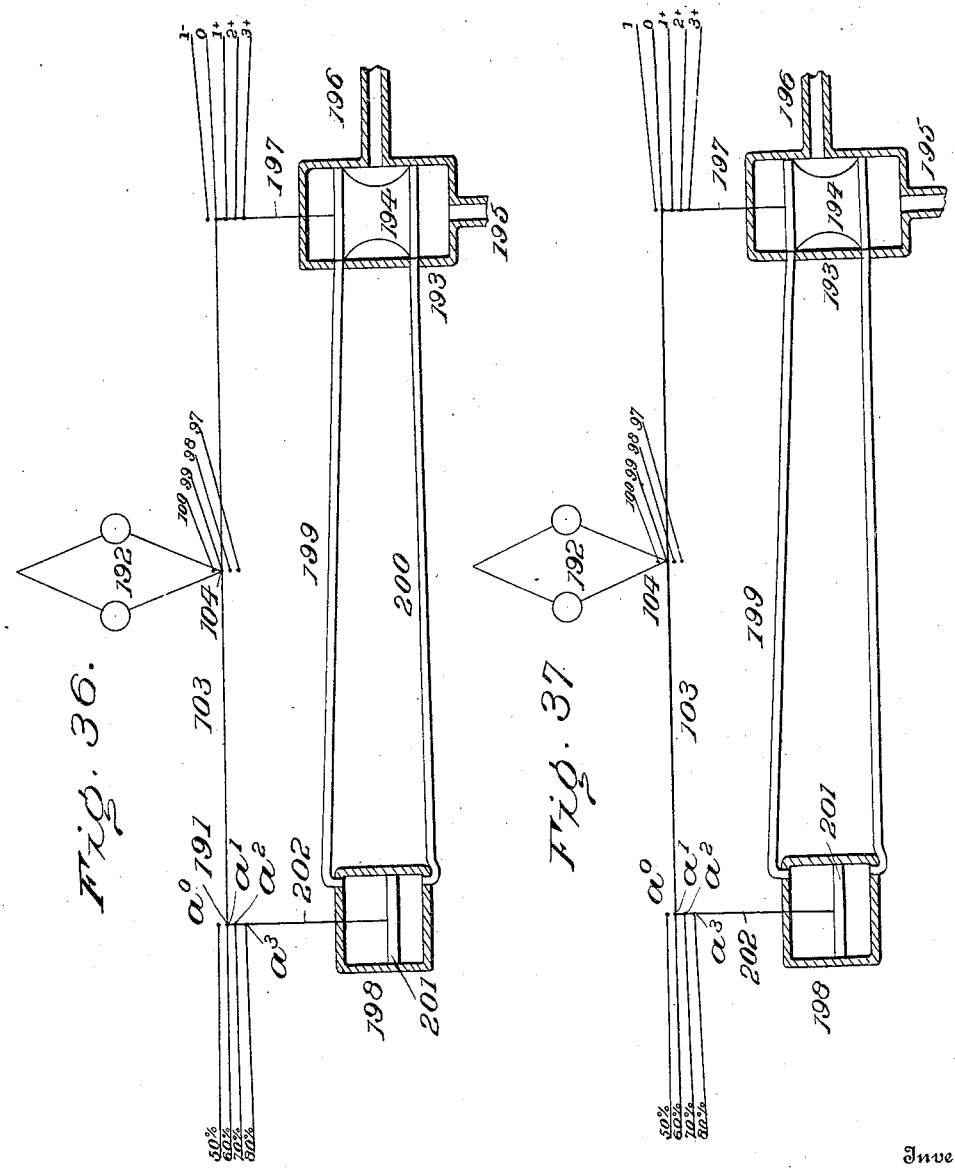

UNITED STATES PATENT OFFICE.

FRANCIS ELLICOTT, OF BALTIMORE COUNTY, MARYLAND.

GOVERNOR FOR PRIME MOTORS.

No. 852,779.  Specification of Letters Patent.  Patented May 7, 1907.

Continuation of application Serial No. 112,058, filed June 17, 1902. This application filed August 22, 1906. Serial No. 331,669.

*To all whom it may concern:*

Be it known that I, FRANCIS ELLICOTT, a citizen of the United States of America, and a resident of Baltimore county and State of Maryland, have invented certain new and useful Improvements in Governors for Prime Motors, of which the following is a specification.

My invention relates to a governing device for the government and control of a turbine water wheel, but the principles involved may be applied to the government of any form of prime motor.

The apparatus which will be described in this case is designed to be operated by water under pressure, but it is to be understood that it may be operated by any other fluid.

My governor herein described is capable of adjustment so as to meet all varying conditions in whatever form they may appear, so as to produce under any condition of load, head or plant, the most perfect regulation and constant speed.

In the apparatus described in the United States patents numbers 664,392 and 664,394 heretofore issued to me, a governing mechanism is described for controlling a turbine water wheel in which the governing mechanism is maintained in a state of balance between active opposing pressures, and is moved in one direction or the other by reducing the pressure on one side or the other of the governing device, so as to cause it to move in the direction of least resistance. In the present application and in co-pending application No. 331,670 a mechanism is described which employs the same principle, with the addition that the parts are maintained in a state of constant oscillation more or less in accord with the normal wave in the pen-stock, and the government is accomplished by reducing the pressure on one side or the other of the governing mechanism, so as to augment the oscillation in the direction in which it is desired that the governing mechanism shall move. The amplitude of the oscillation is always the same, but the path of the oscillation changes with a change of load, and produces a corresponding change of gate. The vibration of the governing mechanism is maintained artificially, and is made to correspond as far as possible with the wave in the pen-stock, with the result that when it becomes necessary to move the parts of the governing mechanism in one direction or another, the artificially imposed motion will assist the starting of the parts in the direction in which it is desired they shall move. It is true that the impulse to move in one direction for the purpose of governing might come at the instant at which the oscillation of the parts was carrying them in the opposite direction, but the period of oscillation is so short that with the return of the part, due to its artificial oscillation, it will be moved quickly and easily in the desired direction under the influence of the two forces, its artificial oscillation and the forces operating to govern.

In the operation of government, the ideal performance consists in a motion of the gate either opening or closing to a point which will bring the wheel, under existing conditions of load, exactly to speed. A fluctuation of the load always takes place prior to the motion of the gate and before the conditions affecting the runner can be altered. When the gate is opened or closed, the existing inertia or momentum of the moving parts can not be overcome in an instant, and a certain interval of time will always exist during which an increased quantity of water must build up the speed of the wheel to equal the load, or a decreased supply of water will permit the load to drag down the speed until reduced to the normal speed. Usually, therefore, it has been necessary in an attempt at government to provide an apparatus which would over govern, that is to say, when a load was thrown onto a wheel to open the gate wider than would be necessary to equalize the added load, in order to accelerate the building up of the speed, and then to gradually close the gate when the speed has been built up so as to bring the speed back to normal, and in the reverse, when a load was taken off of the wheel to close down the gate to a point below that necessary to equalize the existing load, allow the load quickly to draw down the speed of the wheel and then open the gate again to bring the speed back to normal. This operation of government, while usually necessary, involves an oscillation between extremes which requires a considerable interval of time to bring the governor to a state of rest, and the wheel to exact speed. In some cases this oscillation is undesirable, and for such cases I have provided a mechanism by which the gate is caused to move in steps toward the position which under any given condition or load will produce normal speed, the length of the steps being dependent upon the fluctuations of the load, and the steps growing shorter and shorter as the speed approaches normal. When a change of speed occurs, making it necessary to open or close the gate, I move it a certain distance in the desired direction, which I call a step, and check it there, although its motion is not wholly stopped, allowing the water admitted by the changed position of the gate to reach its maximum effectiveness upon the runner, and then if maximum effectiveness is not sufficient to bring the wheel to speed, the gate is moved again another step, this time shorter than the last one, and it is checked again for a period of time long enough to permit the water to reach its maximum effectiveness upon the runner at that gate. If this position is not sufficient to bring the wheel to speed, the gate is moved another step, still shorter, and so on step by step, each step being shorter than the last, until the gate is brought to the exact position which will produce exact speed.

It is not necessary in my governor that the wheel should be kept off of speed in order that it may be able to start to govern for changes of load. Many governors heretofore constructed require that the wheel shall be kept somewhat off speed in order that they may be in position to begin the operation of government. My apparatus is so constructed that the wheel must come absolutely to speed, and must do so not by over government, but the gate must move with a positive motion up to the speed line, and there remain until a change of load occurs. Great and rapid fluctuations of load require great and rapid fluctuations of gate, small fluctuations of load require small and slow fluctuations of gate. My governor is designed to produce this result, to move the gate rapidly and a great distance for large fluctuations of load, and slowly and a short distance for slight fluctuations of load.

My invention further consists in a device by which two wheels running in parallel and operating electric generators may be caused to operate together and equally divide the load cast upon them. When two or more units are running in parallel operating generators feeding the same plant, the one which yields most readily to power applied to it will move first and faster under usual conditions employed for governing. No two wheels can be made so exactly alike that the amount of power necessary to move the gates and control the wheels, will not differ, and often differ considerably. If, therefore, a uniform amount of power be applied to two such wheels, the gate of one will move farther and faster than the gate of the other, and the load will not be equally distributed between them. The one which moves most readily will be opened faster and closed faster than the other one, and will do the largest share of work; the one moving slowly will do less than its proper share. It is desirable that they move together, and that both, or any number of wheels which may be running in parallel, should be caused to carry an equal proportion of the load. This I have accomplished by the apparatus herein described.

In the drawings the same numerals represent the same parts in all figures.

Figure 2:
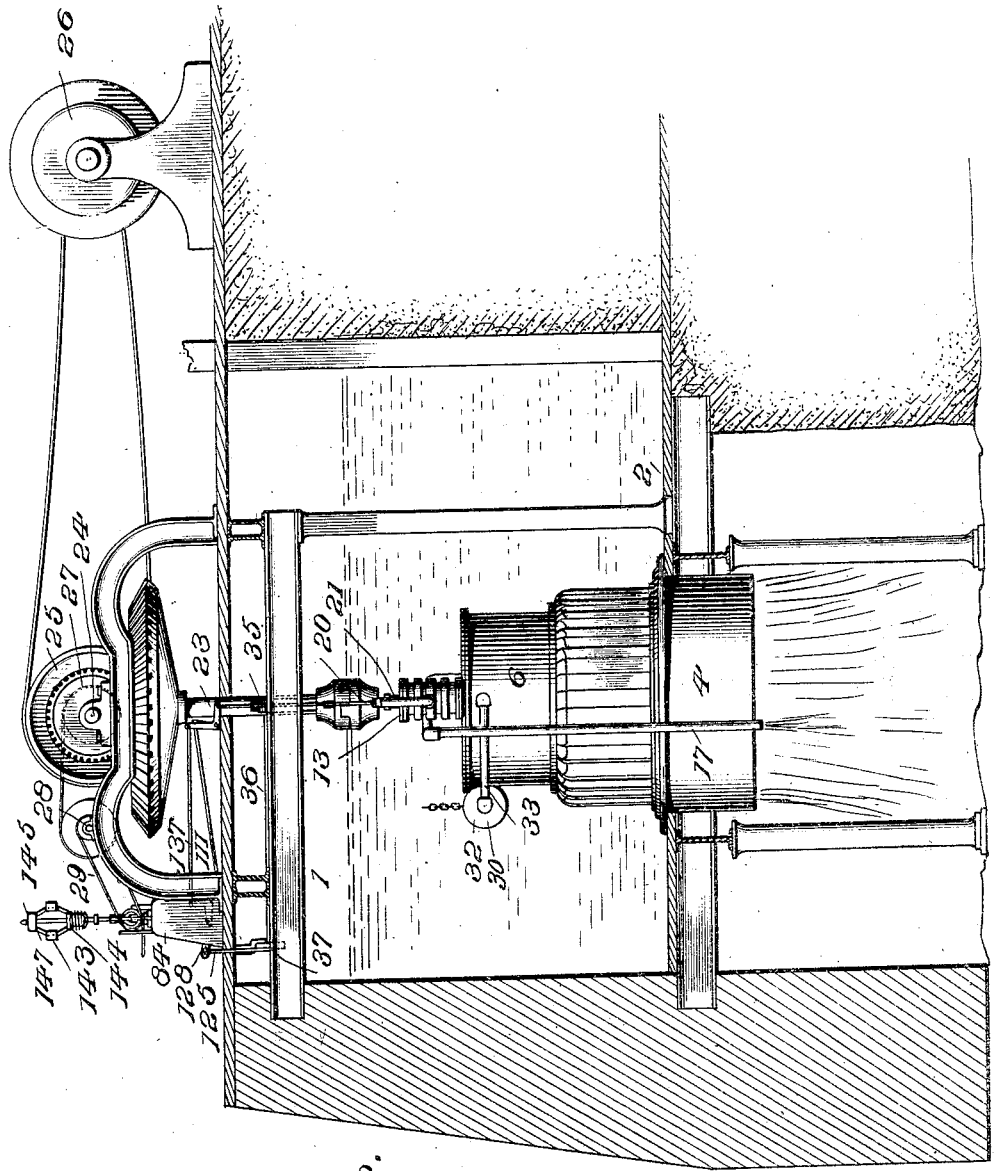
Figure 3:
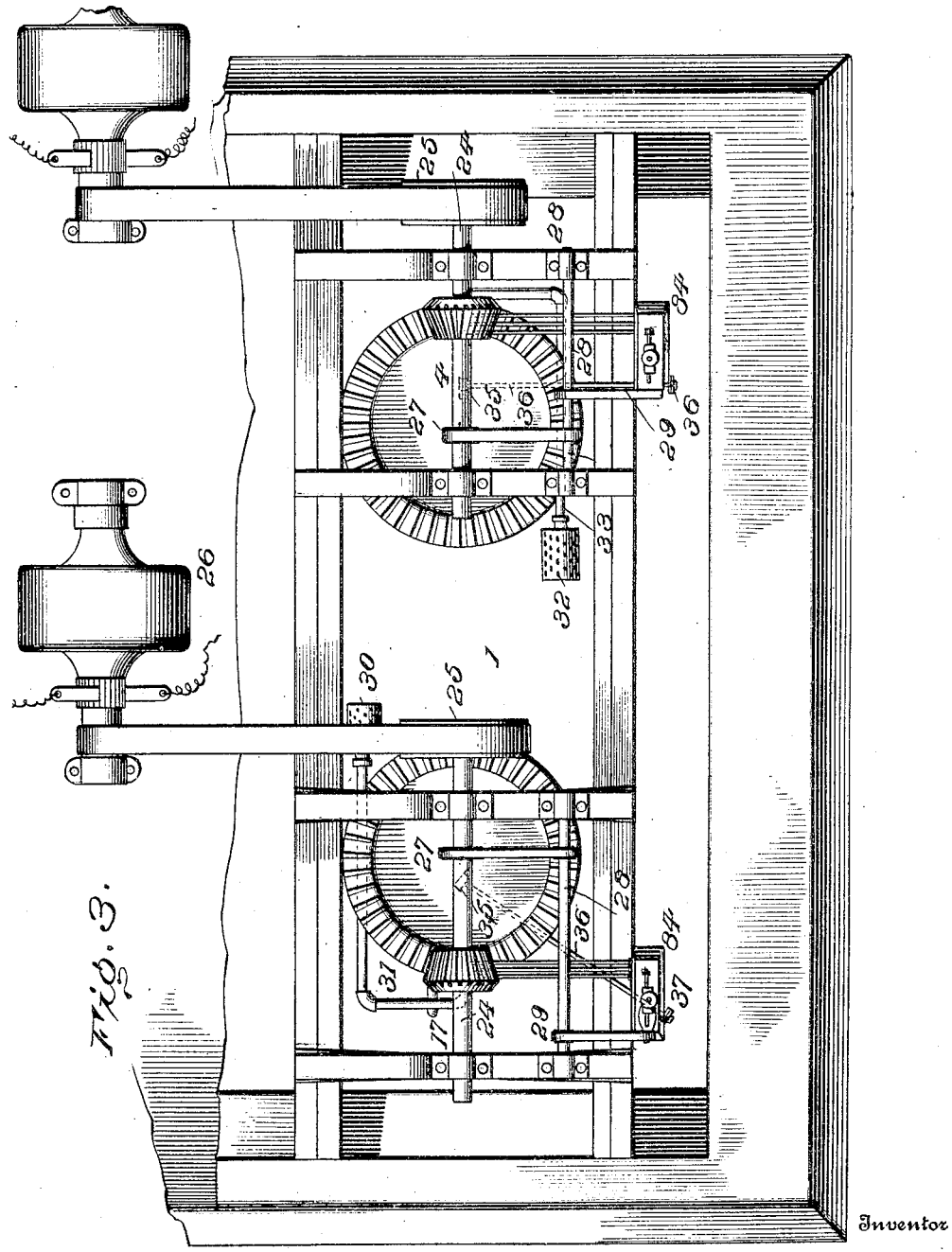

Figure 1 is a vertical longitudinal section of a wheel pit, showing a pair of wheels in full elevation mounted therein, each operated with a governor mechanism quite independent of the other, and yet arranged to run synchronously with each other. Fig. 2 is a vertical transverse section of the wheel pit, showing one of the wheels and governors in full elevation. Fig. 3 is a plan of the wheel pit and wheels, showing the connection of the wheels with two independent generators which are operating the same line, and which are arranged to step together. Fig. 4 is a full elevation of the governor head and its connected levers and rods by which the main, exhaust, and relief valves of the governor are controlled. Fig. 5 is a part vertical transverse section, part full elevation of the governor head and its levers. Fig. 6 is a full elevation of a detail of the governor head, showing the device by which the governing mechanism is oscillated, and other connections. Fig. 7 is a detail and full elevation of a part of the governor head, showing the device by means of which the main valve is closed independently of the governor head. Fig. 8 is a vertical transverse section of the structure shown in Fig. 7, through the line a—a. Fig. 9 is a detail, showing in perspective the levers and connections by which the main valve is operated to open under the influence of the head and to close independently of that influence. Fig. 10 is a detail of construction of the eccentric by which the main valve is oscillated. Fig. 11 is a detail of the construction by which the main valve is closed independently of the governor head. Fig. 12 is a detail of the crank by which the main valve is oscillated. Fig. 13 is a vertical transverse section of the stand carrying the governor head, showing some of the levers and rods and bell cranks, by which the main, relief, and exhaust valves are operated. Fig. 14 is an isolated detailed view in perspective of some of the levers, bell cranks, rods and shafts by which the main, relief and exhaust valves are operated, as well as the link which controls the exhaust valve, and by which it is connected to the gate. Fig. 15 is a vertical transverse section of a cushioned cylinder interposed in the connections to the exhaust valve by which the exhaust valve is moved independently of its actuating mechanism. Fig. 16 is a vertical front elevation of the cam by which the motion of the gate is reduced and communicated to the exhaust valve. Fig. 17 is an isolated detail view of the lever and rod connections by means of which the relief valve is operated. Fig. 18 is an isolated detail view of the lever and rod connections by which the exhaust valve is operated. Fig. 19 is an isolated detail view of the lever and rod connections by which the main valve is operated. Fig. 20 is a vertical transverse section of the cam shown in Fig. 16. Fig. 21 is a vertical transverse section of a turbine water wheel, having a governor cylinder mounted on top of its casing, and a piston connected to its gate, with connections by which the governor is controlled. Fig. 22 is a vertical transverse section of the valve chest, containing the main valve, the exhaust valve, and the relief valve, all shown in vertical transverse sections. Fig. 23 is a perspective view of the exhaust valve. Fig. 24 shows two diagrams, representing relative positions of the main valve when oscillated, one diagram showing the positions of the valve when oscillated an equal distance on each side of the port, and the other the position when oscillating a greater distance on one side of the port than on the other. Fig. 25 is a horizontal transverse section through the line A—A of Fig. 22. Fig. 26 is a horizontal transverse section through the line b—b of Fig. 22. Fig. 27 is a perspective view of the bushing which is secured to the interior of the main valve chest and within which the main valve reciprocates, and on the outside of which the exhaust is mounted. Figs. 28, 29, 30, 31, 32, 33, 34, 35, 36 and 37 are diagrammatic views showing the relative position of a hypothetical apparatus and intended to illustrate the mode by which the wheels running in parallel are caused to equally divide the load.

Referring to Figs. 1, 2, and 3, 1 is a wheel pit across which there is a water tight floor 2, upon which rest two turbine water wheels, one numbered 3, and the other numbered 4. On the tops of the wheel casings are mounted cylinders 5 upon 3 and 6 upon 4. The wheels and cylinders are shown in an enlarged view, in vertical section, in Fig. 21. 6ª is a cylindrical gate, rising to open and lowering to close, to the upper edge of which, within the cylinder 5, is secured a piston 7. The piston 7 is perforated and surrounds and slides upon a sleeve 8, within which is the runner shaft 9. 10 is a runner secured to the lower end of the shaft 9, and 11—11 are buckets of the runner. 12 is a rod connected to the piston 7, and passing out through the top of the cylinder. 13 is a valve chest for a valve which controls the admission and outflow of pressure to and from the cylinder 5. 14 is a port exhausting pressure from the valve chest 13 above the piston 7. 15 is a port exhausting pressure from the valve chest 13 to a point below the piston 7.

In the construction shown in Fig. 21, the piston 7 is perforated at 16, and through that perforation passes the pipe connected to the port 15. It is not necessary nor desirable that the piston 7 should be packed tightly in the cylinder 5; on the contrary it is better that it should have some play, and that there should be a considerable flow of water through and around the piston 7, within the cylinder. 17 is the exhaust port from the valve chest. 18 is a main valve stem. 19 is the exhaust valve stem. 20 is the relief valve stem. 21 is the relief valve by-pass connected at one end to the relief valve chamber in the top of the valve chest, and at the other end with the exhaust 17.

Turning again to Fig. 1, 22 is a general structure called herein the governor head, and its connecting levers, links and rods by which motion is communicated to the main, exhaust, and relief valves, and by which the governor head receives adjustment from the gate. The rod 12 is connected as shown to the governor head and communicates the motion of the piston and the gate to the governor head for the purpose of adjustment. The rod 18 is connected to the main valve and through various levers to the governor head; the rod 19 to the exhaust valve and through various levers to the governor head; and the rod 20 to the relief valve and through various levers to the governor head. The wheel 4—6 in Fig. 1 is identical in its details of construction with the wheel 3—5. The valve chests and their connections are identical, the valves and their rods and the connections are identical and the governor heads are identical, and they are entirely independent except so far as they are electrically bound to one another, from the fact that they each operate electric generators which necessarily run synchronously with one another, both feeding the same line.

Referring to Figs. 1, 2 and 3, it will be seen that the main shaft of wheel 4—6 which is marked 23, drives through a pair of beveled gears the counter shaft 24 upon which is secured a pulley 25 belted to the generator 26 and another pulley 27 belted to the counter shaft 28 through which the governor head is driven by means of a belt 29 running on suitable pulleys. 30 is a strainer on the end of the pressure pipe 31, by which pressure is admitted to the valve chest 13 of wheel 3—5. 32 is a similar strainer connected to pressure pipe 33 by which pressure is admitted to the valve chest of wheel 4—6 which is identical with the valve-chest 13.

By reference to Figs. 1 and 21, it will be seen that pressure is constantly maintained upon the inlet 31, and from the valve chest 13, according to the position of the main valve, passed into the cylinder 5, either above or below the piston 7, causing that piston to move up or down as the case may be. As it moves up or down, the exhaust 17 is opened and the fluid contained on the opposite side of the piston is exhausted.

It will be understood, as explained in my previous patents, that the action of the main valve controls the motion of the piston 7; the pressure on both sides of the piston being constant and uniform, the motion of the piston is accomplished by relieving the pressure on one or the other side of the piston. The speed with which the piston will move will depend upon the aperture of the valve, and the piston may be made to move at varying speeds by varying the position of the valve; thus the piston may be made to move rapidly at first and subsequently caused to move slowly as it reaches the limit of its desired motion by closing down the exhaust valve. The rod 12 is connected direct to the piston 7, and has upon its upper end a rack 34 which meshes with a pinion 35 secured upon the end of the counter shaft 36. Upon the opposite end of the shaft 36 is a cam 37, which consists of a disk having a spiral cam groove cut in its face. This cam is shown in an enlarged view and greater detail in Fig. 16, and in vertical section in Fig. 20. The purpose of this cam is to reduce the motion of the gate to a desired degree. The curve of this cam may be simple or complex. It may be a direct simple proportion, so as to cause the parts to which it is connected to move in exact proportion to the motion of the gate, or it may be somewhat differently constructed to give any desired motion of the cam rod. A diagrammatic curve representing the efficiency of the wheel would not be parallel to a curve representing the motion of the gate, and it is sometimes desirable to cause this cam to approximate the curve of efficiency more nearly than the curve which exactly represents the motion of the gate.

Referring to Fig. 22, which is a vertical transverse section of a valve chest and valve, the valve chest is provided with three circular channels on its interior surface, 38, 39, and 40. The channel 38 is near the bottom, and is connected to the port 14. Channel 39 is at the center and is connected to the exhaust port 17 and communicates with the by-pass channel 21 communicating with the relief valve. The channel 40 is at the upper end and is connected to the port 15. 41 is a bushing secured within the valve chest in the position shown. The bushing 41 is constructed in two diameters and with three series of slots. The bushing is shown in perspective, detached from the cylinder, in Fig. 27. It has a series of ports 42—42 which register with the channel 38 and through which pressure is admitted from the pressure pipe 31 and the interior of the bushing to the channel 38 and the pressure port 14. It has a second series of ports or slots 43—43 which register with the channel 39 and through which the exhausting fluid entering the bushing through the port 14 or the port 15 escapes to the exhaust channel 39 and the exhaust 17. It has a third series of ports or slots 44—44 which register with the channel 40 and through which pressure is admitted from the pressure pipe 31 and the center of the bushing into the port 15. The upper end of the bushing, which is marked 45, is of smaller diameter than the lower part, the lower part being of the same diameter as the interior of the valve chest, fits closely within the valve chest and is secured therein by a set screw 46. The upper part 45, being of smaller diameter than the lower part, forms at the juncture between the smaller and the larger parts a shoulder 47. 48 is an exhaust valve shown in perspective and in detail in Fig. 23. It is cup shape in form, has apertures 49—49 in the top, and ports 50—50 in the sides. The exhaust valve 48 is of such a diameter as to fit snugly over the smaller portion 45 of the bushing 41, and when so placed upon the bushing to be of the same external diameter as the larger part of the bushing, only slightly less than the interior diameter of the valve casing in which it reciprocates and fits snugly. The ports 50—50 in the cylindrical portion of the exhaust valve register with the channel 40, and with the ports 44—44 of the bushing. They are, however, wider than the ports 44—44 and of such a width that those ports will never be obstructed, no matter what the position of the exhaust valve may be. 49—49 are ports in the top of the exhaust valve cup which are partially closed by a flexible diaphragm 51 held in position against the interior surface of the top of the exhaust valve by the nut 52 screwed onto the end of the sleeve 53 by which the exhaust valve is supported and operated. In the centers of the ports 49—49 the flexible diaphragm 51 is perforated with small holes. These holes are made so small as to admit only a small quantity of water through them when pressure is relieved above the exhaust valve by the opening of the relief valve, but large enough to permit equalization of pressure above and below the exhaust valve when the relief valve is closed. The exhaust valve 48 is secured to the lower end of the sleeve 53, which is mounted upon the main valve stem 18. 19 is the stem, as before stated, connected to the upper end of the sleeve 53, by which motion may be communicated to the exhaust valve by suitable mechanism. The sleeve 53 passes through the top of the valve chest through a stuffing box 54. 55 is the main valve, cylindrical in form, hollow in the center, of larger diameter at the two ends than in the middle, suspended from the lower end of the valve stem 18 by which it is operated. The external diameter of the two ends of the main valve is slightly less than the internal diameter of the bushing 41, and the width of the enlarged ends of the main valve is about the same as the width of the ports 42—42 and the ports 44—44 in the bushing 41. When the two enlarged ends of the main valve 55 cover the ports 42 and 44, those ports will be nearly closed, except that the enlarged ends of the main valve, being of somewhat smaller diameter than the interior diameter of the bushing, will permit a constant flow of water, although in small quantities, through the pressure main into the cylinder 5, and out again through the exhaust. The direction in which this flow will take place will depend upon conditions which are immaterial to the present consideration. If the structure is a vertical structure, such as is shown in Figs. 1, 2 and 21, then the weight of the gate and piston must be overcome by pressure, and for this reason the exhaust valve must always be kept slightly open and the main valve must always be maintained in such a position that pressure will flow in through the port 15 and out through the port 14. The central outside diameter of the main valve is small enough to permit a free passage of the exhausting fluid through either the port 14 or the port 15 into the chamber surrounding the main valve, and thence into the exhaust channel 39 and to exhaust 17. The center of the main valve, as before stated, is hollow, and open to pressure from the main pressure pipe 31, so that both ends of the valve chest are filled with fluid under pressure. When the main valve stands over the ports 42 and 44, the gate will be stationary; when it rises, the gate will descend, when it descends, the gate will rise. In the top of the valve chest there is an opening 60, upon which is mounted an auxiliary valve chamber 61, in which is fitted the relief valve 62, connected to, and moved by a valve stem 20. The chamber 61 is in communication with the main exhaust through the bypass 21, and is provided for the purpose of exhausting the pressure from the top of the valve chest when it is desired to quickly open the exhaust valve.

Fig. 25 is a horizontal section of the valve chest taken through the line A—A of Fig. 22. This figure shows a full top plan view of the main valve 55 and it also shows the coincident ports 50 of the exhaust valve and 44 of the bushing, and the unobstructed passage way from the pressure pipe 31 up through the center of the main valve, thence through the ports 44 and 50 into the channel 40, and thence to the pressure ports 15.

Fig. 26 is a horizontal section through the center of the valve chest, the bushing and the main valve, and the exhaust 17, and shows the connection between the chamber surrounding the main valve and the exhaust of the bushing and the channel 39, which is connected to exhaust through the ports 43—43.

The automatic operation of the three valves shown in Fig. 22 in a proper relation and correspondence to one another, as well as independently under proper conditions, constitutes the essence of my invention. I do not intend to limit myself to the structure shown, nor to any mechanically equivalent structure, for the structure, while new, does not constitute all of my invention, which includes modes of operation, acts and series of acts, performed in a certain order, producing a succession of functions, the accomplishment of which and the succession of which are essential to accurate government of a turbine water wheel.

By a simple mechanical structure the main valve 55 is caused to vibrate,—to rise and fall constantly,—and this motion is maintained at all times of the operation of the governor.

The positions of the main valve may be illustrated by the first diagram in Fig. 24, in which the position marked 1 is the position shown in Fig. 22, when the ports 42 and 44 are opposite to the flanges of the main valve, and a small amount of water is being admitted through the port 15, and escaping again by port 14 to the exhaust. The position marked 2 represents the uppermost position of the vibration, and the position marked number 3 is the lowest position of oscillation. It will be noticed that the positions 2 and 3 are equally distant from the neutral position, one above and the other below. The vibrations are accomplished at any desired interval, and the reversal of pressures produced by this vibration upon the two sides of the piston 7 are of short duration, and in exact opposition to one another, with the result that while the piston feels the vibration and responds thereto its motion or want of motion is the resultant of these pressures. The position of the piston and gate are dependent upon the speed, and the governor head which responds to the speed will determine what this resultant shall be.

The second diagram shown in Fig. 24 represents the position of vibration of the main valve after it has been moved down by a decrease of speed. The vibration continues through the same amplitude, but the vibration is from the position marked 2 to the position marked 3; that is to say, from a position in which the ports are closed and no descending impulse is given to the piston to a position marked 3 in which the valve is open, and a strong impulse is given to the piston to move up. The result will be that the piston will move step by step so long as the main valve continues to vibrate in this position, and so long as the main valve is in any position, other than the position shown in Fig. 24.

The return of the valve past its port and the consequent vibration of the pressures constitutes a method of government, which method consists in vibrating the pressure controlling mechanism above and below a neutral line, through a constant amplitude, an equal distance on both sides of the neutral line, whereby the pressures on both sides of the governing piston will be equalized, and while it may be moved, it will be moved an equal distance in two directions, and the resultant effect upon the gate will be zero, then moving the controlling valve of the govering mechanism while vibrating in a direction corresponding to the direction in which it is desired the gate shall move, and continuing the vibration through the same amplitude, but with the result that pulsations of pressure will be applied to one side of the piston controlling the gate only or of greater pressure on one side than on the other, with the result that the controlling piston will move in the direction of least resistance and open or close the gate.

Artificial vibration of the governor head or centrifugal governor and its connection plays quite as important a part in the sensitiveness of that structure as does the vibration of the motor controller. The position of the centrifugal governor for any given speed is the result of the balance between centrifugal forces, which tend to throw the weight outward, and the weight of the parts and the resistance of the springs, which have a tendency to draw the weights together. When a neutral position of the weights is reached for any given speed, by a balance of these forces, then the capacity of the centrifugal governor to do further work is zero, and while the weights are revolving in a circular path many of its parts are stationary.

There are two influences which will resist a change of position of the governor head, and a change of its neutral position, which is the position representing the position of balance between centrifugal force and the forces which resist centrifugal forces. The first of the forces which will resist a change of the neutral position is the inertia and momentum of the moving parts, and the second is the friction of all of the parts. When a change of speed in a motor occurs, its influence will be at once felt by the governor, but unless the change is large enough to overcome the two forces above mentioned, momentum and friction (which two forces are tending to hold the governor head upon the neutral position) the governor will not respond. For this reason many centrifugal governors will not respond to a change of speed of less than one-half of one per cent. I have overcome both of these elements of inertness in other governors by my method of vibrating the parts. I overcome the effect of the inertia and momentum which would resist a change of the neutral position, and also the friction, by the mechanical power applied to the parts to keep them constantly moving back and forth. The governor weights are caused to move back and forth across the neutral line, and the connections of the governor to the valve are also kept moving, and thus by maintaining artificially the governor weights off the neutral line, so that they are always either approaching it or receding from it, in a constant state of activity, I maintain a certain amount of active power available to be exerted upon the valve stem or other governing gear connected to the governor, so that at any moment at which a change of speed occurs there will be power enough in the governor to move the valve or other controller. As soon as a change of speed occurs, the neutral line is instantly shifted, and the change of the neutral line is communicated to the valve or other controller, there being no resistance to change of position in the governor, and some power always available to act upon the valve or other controller. The instant that a change of speed occurs, the neutral line is shifted, and with it the valve or other mechanism controlled by the governor. Then too with my form of governor using a screw and nut connected by a spring, both of which are movable, the sensitiveness of this connection is greatly increased by keeping the parts in a constant state of motion. The winding and unwinding and the coiling and uncoiling of the connection between the nut and the screw for fluctuations of speed requires that the parts shall move with the least resistance in immediate response to a change of speed. In this case, as in the case of the governor balls, the forces which resist motion are inertia and friction. Both of these elements of resistance are eliminated by the mechanically applied vibration, the amplitude of which is capable of change to suit varying conditions. It will be perceived, therefore, that I have succeeded by my system of vibrating the parts mechanically in eliminating most of the influences which operate to reduce the sensitiveness of most centrifugal governors. I mechanically reduce the resisting influence of momentum, the resisting influence (largely) of inertia, and the resisting influence of friction, and with these resisting influences eliminated, my apparatus stands ready to respond to the slightest fluctuations of speed in the most minute fraction of time.

The vibrating, besides overcoming the inertia, momentum, and friction, takes up the lost motion of the parts, keeps everything in a state of activity and makes the parts sensitive to respond to any change of pressure which may be brought to bear upon them. It also accomplishes what is of the utmost importance. It compels the piston and gate to move under usual conditions with a step by step motion and secures an interval of time between the steps, during which time the water flowing through the gate upon the runner has an opportunity to become effective upon the runner and build up its speed as rapidly as the gate is opened. As before stated, it is undesirable in some cases that the gate should be opened any faster than the water in the pen-stock can enter the wheel and make itself active upon the runner to build up the speed of the runner, and it is desirable that the gate should open with a step by step motion at a speed no greater than the speed at which the water can become effective upon the wheel.

It will be remembered, as has been heretofore stated, that the main valve is loose in its valve chest, and although the ends of the valve may stand opposite the ports of the cylinder, they never close them, but always leave a certain space for the flow of fluid past the valve to exhaust, both from the cylinder and from both ends of the valve chest. Sometimes it is desirable to give the main valve a certain amount of lead, to exhaust on both ends, in which case as the valve is moved up to its central position by the governor head the passage way to exhaust at one end will be greater than at the other, hence as the pressure is relieved by the greater exhaust at one end the valve will be moved by the increased pressure of the other end back into its central position. Thus we will get for each motion of the valve out of its central position by the governor head a creation of a condition which will tend to force the valve back into central position by fluid pressure. The opposing forces acting on the main valve, that is to say, the weight of the governor head and the weight of the valve itself acting to force the valve down in case of a drop in speed, and the fluid pressure in the valve chest acting to force it up to central position when depressed will give to the valve and to the parts to which the valve is connected, and also to those which are controlled by it, a vibrating motion. This vibration will take place in the same manner, whether the valve be lowered by a drop of speed or raised by an acceleration of speed. As the valve rises and falls, the spring 149 will be more or less compressed and the weights 143—143 will be moved into a circle of greater or less radius. As the radius increases or decreases, the resistance of the air to the weights will be increased and decreased, and the strength of the pull of the weights upon the spring 141 will be greater or less with each change of radius. The spring 141 will yield to any change in the pull of the weights and will again restore 141 will thus act as a hair spring of a watch, while the valve will be moved by the change of pressures above and below it, much in the same way as the valve of a hydraulic ram moves, being moved by the current flowing past it, but settling by gravity when the current is checked. The natural vibration of the valve due to the causes above described may be insured and regulated by mechanical means,—such a device as I have shown and described in this application. The amplitude of the oscillation of the governor head and the main valve can be regulated and controlled by anything that may be desired. When a drop of speed occurs, and the main valve is dropped, so as to exhaust pressure on the side of the piston which will permit the gate to open, if the drop of speed is not abnormal, the action of the artificial vibration of the main valve will be to close and open the main valve alternately, and thus check and accelerate the motion of the gate with each vibration. This successive acceleration and checking or retardation of the motion of the gate (for it never stops entirely while speed is changing) will give to the gate a step by step motion which permits the added water admitted to the runner with each step to become effective upon the wheel to build up its speed before another step is taken.

If the drop of speed is abnormal and the main valve be carried down to a point where the return of its vibration will not bring it back to the ports at all, then the relay mechanism is brought into play, by which it is returned to speed position.

Referring to Figs. 1, 4, 14, 19 and 22, the exhaust valve 48 is connected positively to the gate through the rod 19 and its connections to the piston 7. It will be closed down so as to be nearly closed or closed to any desired extent when the gate is nearly closed. If, now, a heavy load be cast upon the plant and it be desirable to open the gate a correspondign amount, this could not be done while the exhaust valve was nearly closed, because while the drop of speed would open the main valve 55, the pressure admitted to the cylinder 5 could not become effective upon the piston 7 to move it except to such an extent as the exhaust would permit the escape of fluid contained in the cylinder. Under these conditions therefore it is desirable that the exhaust valve should be opened suddenly and fully so as to permit a free exhaust, and thus permit a rapid motion of the governing piston 7. To accomplish this result, the auxiliary valve 62 is provided and reciprocates in the auxiliary valve cylinder 61, and controls the by-pass port 21. The exhaust valve chamber 61 is connected to the top of the main valve chest by the opening 60.

Under normal conditions, when the relief of the valve chest will pass through the openings of the flexible diaphragm 51, and equalize the pressure on both sides of the top of the exhaust valve. When a sudden and large drop of speed occurs, the main valve stem 18 will descend. It is so connected to the relief valve stem 20 that when the depression of the main valve stem is abnormal, it will open the relief valve 62, and immediately the space above the exhaust valve will be opened to exhaust to an extent dependent upon the opening of the relief valve, through the by-pass 21 and the pressure on the upper side of the exhaust valve being reduced, the exhaust valve will be thrown open by this unbalancing of the pressure, as fast as the opening of the relief valve will permit, and the piston will be as free to move under the influence of excess pressure on one side or the other of it as the aperture of the exhaust will allow.

The exhaust valve, as before stated, is connected to the piston and gate, and, under ordinary conditions, moves with them; but in order that it may be given the capacity for independent motion just described, while retaining its dependent motion, a device is interposed in the connections which is shown in vertical section in Fig. 15. It consists of a dash pot 63 mounted upon the upper end of a rod 132, within which reciprocates a piston 64, to which is connected a piston rod 65 which passes through the head of the dash pot through a stuffing box 66. Above and below the piston 63 are springs 67 and 68. The dash pot above and below the piston 64 is filled with oil or other fluid, and 69 is a by-pass connected to the two ends of the dash pot and connecting those ends so that the oil above and below the piston may flow from one side to the other. 70 is an adjustable valve capable of being set to control the apertures of the by-pass 69 and to regulate the speed with which the oil will be permitted to pass from one side of the piston to the other. A sudden opening of the exhaust valve will tend to draw dash pot 63 upward, and the piston 64 will advance in the dash pot, compressing the spring 67, while the spring 68 becomes elongated. The oil above the piston 64 will pass down through the by-pass 69 into the lower part of the dash pot at a speed controlled by the valve 70. As the gate opens under the influence of the pressure exerted upon the piston 7, the speed of the wheel will be built up, and as it is built up the governor head will correspondingly rise and draw up with it the main valve stem. As it does so, the relief valve 62 will be restored to a position covering the exhaust port 21, and an equal pressure will be re-established on each side of the exhaust valve. As soon as this condition occurs, the stored power contained in the compressed spring 67 in the dash pot 63 will begin to assert itself and force the piston 64 back to a central position in the dash pot until the pressure of the two springs is equalized. The speed at which this action takes place will depend upon the aperture of the valve 70, and the ultimate position of the exhaust valve will depend positively upon the position of the gate.

*Mechanism for oscillating main valve.*— Figs. 5, 6, 8, 9, 10 and 12 show the parts by which the positive oscillation is imparted to the main valve. Referring to Fig. 5, 80 and 81 are fast and loose pulleys, by means of which the motion of the runner is communicated to the governor head. These pulleys are mounted upon a shaft 82, journaled in the bracket 83, which is mounted on the stand 84. 85 is the governor shaft mounted vertically in the bracket 83, and in the bearings 86 and 87. Upon the shaft 82 is cut a worm screw 88, with which meshes a worm wheel 89, which is mounted upon a counter shaft 90. The counter-shaft 90 is journaled in suitable bearings on the bracket 83. The mounting of this counter shaft and the worm wheel 89 is shown in vertical section in Fig. 8. Upon the end of the counter-shaft 90 is secured a crank plate 91, shown in full elevation in Fig. 12. The crank plate is slotted across its center, and in the slot slides a crank bearing block 92 which is capable of being set at any desired position in the slot. The distance to the center of the crank pin 93 borne by the crank plate 92 from the center of the counter-shaft 90 will determine the throw of the rod 94 which is connected to the crank pin 93. The upper end of the rod 94 is connected to a lever arm 95, shown in Fig. 6, and also in Figs. 9 and 10. The lever 95 is connected to one end of the pin 96, which has an eccentric portion 97. The eccentric portion is shown in three views in Fig. 10. The first is the end view showing the eccentricity of the pin 96; the second view is a perspective showing the relation of the parts; and the third is a vertical section. The lever 95 is fast on the end of the pin 96; and the larger part of the pin 96 is journaled in a stationary arm 98, which is secured permanently to the upper portion of the bracket 83. The revolution of the counter-shaft 90 revolves the crank pin 93 and reciprocates the rod 94, which moves the lever arm 95 up and down and turns the larger part of the pin 97 in its bearings in the arm 98. This causes the small part 96, to which the lever 95 is secured, to describe an arc of a circle the center of which is the center of the larger part 97. Pivotally attached to the two projecting ends of the pin 96 are two links 99 and 100, which rise and fall with the motion of the lever 95. To these links are connected another pair of links 101 and 102, which are in their turn connected to the governing lever 103, which is pivoted upon trunnions not shown on each side of the ring 105 which surrounds the screw 106 of the governor head. The opposite end of the lever 103 is connected by means of a pair of links 107 to a rod 108. The rod 108 is connected through a series of links and levers to the main valve stem 18. The connections are shown in Figs. 13, 14, and 19. It will thus be seen that every revolution of the countershaft 82 will communicate its motion to the countershaft 90. This will reciprocate the rod 94, turn the eccentric pin 96 and 97, and give to the links 99 and 100 and 101 and 102 a vertical reciprocating motion which is communicated to the lever 103, and to the main valve rod 108. This motion is a constant motion; no matter what the position of the main valve or its motion may be due to other causes, this reciprocation continues, and through the same amplitude.

Referring to Figs. 13 and 19, the rod 108 is connected at its lower end to a bell crank 109, journaled upon a shaft 110. One arm of the bell crank 109 is horizontal and is connected to the lower end of the rod 108. The other end is vertical and is connected to a rod 111 shown in Fig. 19, which at its opposite end is connected to one arm of a bell crank 112, the other arm of which is connected directly to the main valve stem 18. These connections are shown in Fig. 2, as well as in Fig. 19.

It will of course be apparent that the extent of the motion of the main valve may be regulated so as to be anything which may be desired, by altering the length and proportion of the various levers and rods through which the motion of the governor head is communicated to the main valve.

The main valve is moved to accomplish several results; First, it is moved under the influence of the governor head in the manner which has been fully described in my previous patent above referred to. Second, it is vibrated to maintain the parts in a state of activity. Third, it is also moved to close, independently of the action of the governor head, under certain conditions. Fourth, it is also moved by still another mechanism for the purpose of being closed or opened or reversed for the purpose of causing the wheel to which the particular valve is connected to operate synchronously with another wheel with which the first one is co-operating in running an electric plant.

*Mechanism for operating the relief valve.—* Referring to Figs. 13, 14, 17, and 19, the relief valve has but one function to perform, and that is to permit the exhaust valve to be opened independently of the gate under certain conditions. The operation of the relief valve has heretofore been stated, and it will only be necessary now to indicate the connections of levers and rods by which the motion of the main valve controlling mechanism is caused to operate the relief valve at certain periods. The main valve rod 108 is connected at its lower end to the horizontal arm of a bell crank lever 109 which is journaled upon the rock-shaft 110, mounted in suitable supports 120. 84 is a stand which carries the supports for the rock shaft 110, also supports for another rod upon which are mounted the levers operating the exhaust valve; and upon its top is mounted the bracket 83, carrying the governor head. This is shown in front elevation in Fig. 4. 113 is an arm rigidly secured to the rod 108, at a suitable distance above the bell crank 109. It is shown in Figs. 14, 17 and 19. 114 is a rod reciprocating through a bracket 117, secured to and projecting from the interior surface of the support 84. Upon the upper end of the rod 114 are two pairs of set nuts 114$^a$ and 115, a desired distance apart. Between the set nuts 115 and the bracket 117 surrounding the rod 114 there is a coil spring 118, and below the bracket 117, and between it and the pair of set nuts 119, is a coil spring 119$^a$, also surrounding the rod 114. The position of the rod is the result of the balance of these two springs. The rod is permitted a limited upward and downward motion controlled by the springs 118 and 119$^a$. 116 is a bell crank journaled upon the rock shaft 110, to the horizontal arm of which is connected the rod 114, at its lower end; and to the other arm of the bell crank lever is connected a rod 122, which at its opposite extremity is connected to a bell crank 123, to which is also connected the exhaust valve stem 20.

In the normal position of the parts as regulated and controlled by the springs 118 and 119$^a$, the relief valve will be closed and the arm 113, which is rigidly connected to the main valve rod 108, may reciprocate with the valve rod without affecting the relief valve. As soon, however, as the arm 113 comes in contact with the set nuts 115 or 114$^a$, and begins to depress or raise the rod 114, it will at once open the relief valve 62 and the exhaust valve will be opened as far as the aperture of the relief valve will permit.

The relief valve is normally closed, but is opened by the abnormal motion of the main valve rod, and the set nuts 114$^a$ and 115 may be fixed at any point upon the rod 114, so as to cause the governor head to open the relief valve after the main valve is moved any desired distance.

*Mechanism for operating the exhaust valve.—* The motion of the exhaust valve normally corresponds to that of the gate, and there is but one condition under which this general rule is varied and that is when an abnormal drop or acceleration of speed occurs. Then it is necessary that the gate should respond to this sudden change as quickly as possible. This is accomplished by a mechanism by which the exhaust valve is suddenly thrown farther open whenever an abnormal change of speed occurs, as rapidly and as wide open as its controlling mechanism will permit. The mechanism by which the motion of the gate is communicated to the exhaust valve and the motion of the exhaust valve is regulated is illustrated in Figs. 13, 14, 16, 18, and 20. The connection is shown in a general view in Fig. 1. The general connection shown in Fig. 1 is of a rod 12, connected to a piston 7, which has upon its upper end a rack 34 which meshes with a pinion 35 secured to the end of a countershaft 36 journaled in suitable bearings from the under side of the main supporting beams which span the wheel pit. 37 is a cam shown in detail in Figs. 16 and 20, by which the motion of the piston is reduced and communicated to the exhaust valve so as to move it a distance corresponding to the motion of the gate. I have previously described the construction of the cam 37 and its cam groove. Fig. 20 shows a vertical section of this cam. Its construction is very simple. 125 is a rod having on its end a roller 126 which takes into the cam groove 127 in the face of the cam 37. The rod 125 is connected at its upper end to the arm 128, Fig. 14. The arm 128 is slotted, and through the slot passes a bolt by which the rod 125 may be secured to the arm at any desired distance from the center of the rock shaft to which the arm is fastened. The arm 128 is secured upon the rock shaft 129, which is journaled in suitable bearings 130—130 mounted in the bracket 84. Upon the rock shaft 129 is also secured an arm 131 which is also slotted, and in this slot is a bolt by which the rod 132 may be secured at any desired distance from the axis of the rock shaft 129. The rod 132 is connected rigidly to the lower end of the dash pot 63, heretofore described. 65 is a piston rod of the dash pot heretofore described. At its upper end it is secured to a lever 133 pivoted at its center to a bracket 134. The opposite end of the lever 133 has connected to it a rod 135 which passes through a perforation in the end of the bracket 117, and is connected at its lower end to the horizontal arm of a bell crank 136. Upon the rod 135 are two pair of set nuts 137ª and 138ª. These set nuts are provided for the purpose of limiting the motion of the rod 135 and thus limiting the throw of the exhaust valve.

Referring now to Figs. 13, 14, and 18, the bell crank 136 is there shown journaled upon the rod 110. The vertical arm of the bell crank 136 is connected to the rod 137, which at its opposite end is connected to a bell crank 138, and the other end of the bell crank 138 is connected to the exhaust valve stem 19.

It will thus be seen that so long as the pressure is equalized on both sides of the top of the exhaust valve, its motion will correspond to that of the gate through the train of mechanism just described, but as soon as the pressure is overbalanced on one side by the reduction of the pressure above it, it will move in the direction of least resistance and be opened so as to permit a quick action of the gate under the conditions described.

*Mechanism for closing the main valve independently of the governor head.* It has been heretofore stated that one of the objects of the invention herein described is to cause the gate, when a change of speed occurs, to move by a step by step motion toward the position which will restore the speed to normal, the gate moving and checking and moving again as often as may be required to accomplish this result, and this is accomplished by a means independent of the governor head. The structure shown in Figs. 4 and 5 is the same general structure which has been heretofore described in the patents which have been previously granted to me. It consists of a centrifugal governor of a peculiar construction having a fly wheel on the top, and in the lower part a screw and a nut connected together by means of a coil spring. The motion of the motor is communicated to the screw through the medium of the coil spring and to the nut, which in its turn drives the governor weights, and they drive the fly wheel.

In Fig. 5 the parts are numbered as follows: 106, heretofore referred to, is the screw which is mounted upon the shaft 85 and provided with a longitudinal groove on its interior which receives a feather on the shaft by which the screw 106 is turned while leaving the screw free to rise and fall upon the shaft as it is screwed into and out of the nut 140. 140 is a nut threaded upon the screw 106, and 141 is a spiral spring connected at one end to the screw 106 at 142, and at the other end to nut 140. 143—143 are the governor weights connected to the nut 140 by the arms 144—144. 145 is a fly wheel supported upon the ball bearing 146, which is loosely mounted on the shaft 85. 147—147 are links connecting the governor weights 143—143 with the fly wheel 145. 148 is a pair of set nuts on the shaft 85 and 149 is a spring bearing between the set nuts 148 and the top of the nut 140. 150 is a seat for the spring 149, below which there is a ball bearing which permits the nut 140 to turn below the seat. The horizontal travel of the governor weights 143—143 driven outward by centrifugal force will cause the nut 140 and the screw 106 to be raised up, and with them will come the lever 103 which is secured by trunnions not shown to the ring 105. A drop of speed will cause the weights 143—143 to collapse somewhat, and the trunnions will be consequently depressed, and move the lever 103 (which is moved by those trunnions, and which, so far as its general motion is concerned, is pivoted at one end upon the pin 151), to depress the rod 108, giving to the main valve 55 (Fig. 22) a corresponding motion, which in the case shown would be to depress the main valve, admit pressure below the piston 7, and cause it to begin to rise, (Fig. 21).

When a drop of speed occurs, the runner and governor shaft feel the drop before it is communicated to the governor head, and the screw 106 is screwed out of the nut 140 a certain distance, and the spring 141 somewhat uncoiled. This action will move the main valve so as to start the opening of the gate. The drop of speed will then be felt by the head, and the weights and nut will drop, and as the nut moves down, the screw will be moved down by it and as the speed of the head comes to the speed of the shaft the nut will be screwed down on the screw, and the spring which has been uncoiled will coil again to normal tension, and the nut and screw resume their normal relation.

The independent means for producing the step by step motion is the structure which will now be described.

Referring to Figs. 4, 5, 6, 7, 8, 9, and 11. 153 is a lever pivoted at 154 upon a boss 170 upon the bracket 83, and at one end 155 connected by an adjustable link 156 with the lever 103 at the point 156ª. It will be observed that every motion of the lever 103 will be communicated to the lever 153, and will cause the free end of that lever to move up and down. 157 (Fig. 7 and 8) is a plate pivoted upon a stud 158 secured into the bracket 159, which is a part of the bracket 83. The plate 157 is shown in detached view in Fig. 11. It is provided upon its two lower corners with pins 160, 161. To one side of the plate 157 is connected the arm or link 162, which is provided with means for extending it so as to give it any desired length. The end of the link 162 is enlarged and provided with a slot 163 parallel to its axis, and in the end of the link is a set screw 164, which is capable of adjustment and setting so as to regulate the length of the slot 163. In the end of the lever 153 (Fig. 4) there is a pin 165 which passes into the slot 163 (Figs. 7, 8, and 9) and controls the plate 151 by its bearing upon the end of the slot in the link 162. It will be seen that when the lever 103 is moved up and down by the action of the governor head, the pin 165 will also be moved up and down in an opposite direction by the lever 153. So long as the pin 165 is not in contact with either end of the slot 163, the motion of the lever 103 will not effect the link 162, but as soon as the depression or rise of the lever 103 is sufficient to cause the pin 165 to come into contact with one end of the slot 163, the link 162 will be drawn, the plate 157 tilted upon its axis, and the parts carried by it moved. The countershaft 90 shown in Fig. 5 protrudes beyond its bracket on the opposite side from the crank plate 91, Fig. 8, and upon the end of it is fixed a pinion 166 which is constantly revolving in the same direction, that is to say, as indicated by the arrow in Fig. 7. On the upper edge of the triangular plate 157 there are three V-shaped notches 167. Upon the bracket 83 is mounted a spring actuated latch 168 having a hook upon its end which is adapted to engage one of the notches 167 and hold the plate 157 stationary, until it is moved by the motion of the lever 153. 169 (Fig. 6,) is a stationary arm projecting from the boss 170 which is secured to the bracket 83, and upon the end of the arm 169 is pivoted a lever 171, one end of which extends toward the valve rod 108 and is connected to that valve rod by a pair of links and set nuts 172, which permit an adjustment of the point of connection of the lever 171 to the rod 108. At its opposite end the lever 171 has suspended from it (Fig. 7) a slotted plate 172ª, the slot being slightly greater in width than the diameter of the pinion 166, and on the interior of each of the legs formed by the slot in the plate is cut a rack, 173 on one side being on that part of the leg which is below the pinion, and the rack 174 being upon that part of the opposite leg which is above the pinion, the highest tooth of the rack 173 and the lowest tooth of the rack 174 being opposite one another. The racks 173 and 174 are of a size to mesh with the pinion 166. The plate 172ª and the racks 173 and 174 stand between the pins 160 and 161 upon the two lower corners of the plate 157, so that the plate 172ª may be moved by the motion of the plate 157 and one or the other of the racks 173 and 174 be thrown into engagement with the pinion. On the outside of the legs 173 and 174 are lugs 175 and 176 having inclined surfaces. These lugs are of such a size that when they make contact with the pins 160 and 161 upon the plate 157 the pins will hold the racks out of contact with the pinion when the plate 157 is hanging in a central position.

If, now, a drop of speed occurs and with it a drop of the governor head and of the lever 103 and the rod 108, the valve will be opened in such a manner as to cause the gate to begin to open. The downward motion of the rod 108 will carry with it the links 172, and the end of the lever 171 which is connected to those links. The opposite end of the lever 171 will be consequently raised a corresponding distance. If the drop in speed is greater than an arbitrarily determined amount, the downward motion of the lever 103 will cause the free end of the lever 153 to rise, make contact with the link 163 and draw upon it, rock the plate 157 upon its point of support and throw the rack 173 into contact with the pinion 166. The previous descent of the rod 108 will have drawn the rack 173 up until its lower end is opposite the pinion 166. Immediately upon the engagement of the rack 173 with the pinion 166, which is constantly running, the pinion, turning in a direction toward the rack, will draw it downward as far as its teeth will permit and with it the lever 171, raising the rod 108 and closing the valve. If, now, the reverse motion takes place and instead of a drop of speed there is an abnormal acceleration of speed, the lever 103 and the rod 108 being drawn up the lever 171 which carries the plate 172$^a$ will be depressed and the upper part of the rack 174 brought opposite the pinion 166. As soon now as the lever 103 has gone up as far as it is desired it shall go, the pin 165 in the end of the lever 153 will make contact with the lower end of the slot 163 and force the link 162 downward, rocking the plate 167 in the opposite direction to its former motion, throwing the pin 161 against the back of the rack 174 and throwing the rack 174 against the pinion 166; which, turning in the direction shown by the arrow in Fig. 7, will raise the rack 174, with it the lever 171, draw the rod 108 downward, and close the valve. This action is quite independent of any readjustment of speed on the part of the governor head and takes place in anticipation of the re-establishment of the speed of the governor head and the re-adjustment of its governor weights. It may be, however, that the motion of the plate 157 will not be sufficient to throw the rack into engagement with the pinion, but only sufficient to raise the end of the hook 168 off the top to the tooth 167. As soon as this condition is reached, the spring of hook 168 will force the hook into the next notch beyond the middle position and throw the rack 173 into contact with the pinion, and hold it there until the pinion has drawn the rack down to the last tooth; when it has accomplished this, it has performed its whole duty, and the plate must be restored to its central position, and the racks to their central position so as to be ready to perform the same function again. The restoring of the plate 157 and the racks to their central position is accomplished by the inclined lugs 175 and 176 which are on the backs of the racks 173 and 174 respectively. When the rack 173 has been drawn down to its full length or the rack 174 has been drawn up to its full length, the lugs 175 and 176 will come into contact with one or the other of the pins 160 or 161, as the case may be, and force the hook 168 out of the notch on one side or the other of the center of the plate, and into the notch at the center, and by the same operation center the racks over the plate and on each side of the pinion, but out of contact with it as shown in Fig. 7.

It will be observed that the adjustment of the lever 103 and the lever 171 upon the valve rod, and the adjustment of the length of the slot 163, the length of the link 162, and the length of the link 156, make it possible to regulate to any extent the period during which the valve is to be permitted to remain at any particular position. That is to say, how long a time the main valve is to be permitted to remain in a position to reduce the pressure either above or below the piston and permit the piston to move. In some cases it may be desirable that the piston should move for a very short period of time, in others it should move for a longer period of time, dependent upon various conditions, generally the difference of head and size of wheel.

It will be observed that when the main valve is brought to its central position by the action of the auxiliary mechanism, the lever 103 will also be raised, and with it the screw and nut, compressing or relieving the spring 149, and moving the governor weights to a position dependent upon the motion of the lever 103. If the centrifugal force developed by the speed of the weights is such as to hold them off their normal position, they will return to the position due to speed, as soon as the pinion 166 releases the rack 174 or 175 and the lever 171 and the lever 103 and move the valve again to a position corresponding to speed position. If this motion of the valve is sufficiently abnormal, the auxiliary mechanism may be again operated and the valve again closed.

As before stated, it will be understood that when the main valve is once so moved as to reduce the pressure on one side of the piston and start it moving toward the reduced pressure, that it will continue to move in that direction until normal pressure is restored on that side of the piston, and this will not occur until the valve is temporarily reversed.

The valve is loose in its valve chest and has some lead on the exhaust side but none on the admission, so that the exhaust is never closed when the valve is in its central position; therefore, while the return of the valve to central position will check the motion of the gate, it will not stop it, but will reduce it to a minimum speed, at which speed it will continue to travel until the valve is reversed. The same action takes place as the result of the vibration of the main valve by the constant oscillation mechanism, but as before stated, if the main valve is moved a distance too great for the oscillation to return it to the ports, the independent relay must be called into action. The period between the changes in the position of the valve due to the relay is much longer than the period due to the normal vibration, and the period due to the relay is capable of regulation so as to be anything that may be desired. The effect of the relay, like the oscillation, is to cause a successive acceleration and retardation of the motion of the gate, the amount of acceleration and the period of retardation being susceptible of regulation.

During the first or small changes of speed, the abnormal vibration will cause small accelerations and corresponding periods of retardation; with greater changes of speed, the relay will cause larger acceleration and corresponding periods of retardation, and as speed is approached the main valve will be moved to a point where it will not reach the relay trip and consequently will be wholly under the control of the governor head and the vibrating mechanism, and the amounts of acceleration and the periods of retardation will be again reduced to a minimum, and as the wheel approaches speed and the valve is oscillated into a reversed position, the difference between acceleration and retardation will become smaller and smaller until they are equal, and the gate will then remain at speed without motion other than its normal pulsation.

A condition often arises which has heretofore caused serious trouble, but which my invention takes care of automatically. The gate of a turbine water wheel is usually out of balance, and the amount it may be out of balance will vary in the same wheel with change of gatage. It is important, therefore, that the governor should automatically take care of this variation of over-balance. It will be understood that if the gate is balanced and the wheel at speed, the valve will stand opposite its ports in the same relation to each port, and as it is oscillated will change the pressure from one side to the other side of the piston equally, and maintain a practically equal pressure on each side of the piston. If, now, the gate be out of balance, say 1000 lbs., this tendency to move in one direction will cause the gate to move until the speed of the wheel is so altered as to affect the governor and the governor will move the main valve into a position which will correct the error in speed and check the motion of the gate notwithstanding the over-balance, and bring the gate to a state of rest at speed, in spite of the over-balance. Now it will be apparent that in order that the gate may be held stationary at speed position when it is overbalanced, it will be necessary that the valve shall also occupy a position which will cause a greater pressure on one side of the piston than on the other so as to counter-balance the over-balance of the gate. There will therefore be a speed position for the valve with one condition of over-balance in the gate, and a different speed position of the valve for another condition of over-balance of the gate; and as the position of the valve is due to speed and the condition of the governor weights is due to speed, it will follow that the position of the weights and valves will be the same so long as the speed is the same, and the resistance of the centrifugal force is the same; but, as before explained, as the main valve gets more and more out of its central position, the over-balance of pressure on it, due to the unequal outlet to exhaust from the two ends of the valve chest, will cause the valve to be forced in the direction of reduced pressure and this pressure on the valve will vary the resistance to centrifugal force acting on the governor head and establish a new speed position for the governor weights which will correspond to the new speed position of the valve; thus with every variation of the over-balance of the gate, there will be a new speed position for the valve and a corresponding speed position for the governor head.

*Mechanism by which power of each of two or more units is held in a predetermined relation to the power of the other.*—In any electrical installations where it is desired to supply a large amount of current to a line, it is frequently economical to divide the generating plant into a number of units, power units and electrical units. The electrical units which contribute to the general current on the line, although they may be quite independent of one another and located at some distance apart, will, in accordance with their electrical construction, step together, and always run at the same speed. With fluctuations of load the generators will feel the fluctuations simultaneously, and will communicate their change of speed to the runners and the governors. The governors, in an effort to regulate the gates so as to correspond with these changes of speed, will apply to the gates power usually of a uniform amount, and the gates will move faster or slower correspondingly in accordance with the resistance which they offer to the forces tending to move them. It is obvious that no two mechanical constructions can be made so exactly alike that the same amount of power will be required to move them under similar conditions, and therefore it is that however identical water wheel constructions may be, different amounts of power will be required to move the gates of two wheels which may be, so far as proportion and adjustment are concerned, identical. If the power applied to move the gates is the same and the resistance is different, the motion of the gates will be different, and it usually happens therefore in plants where a series of wheels are running together, feeding a common line, that the gate of one wheel will move more rapidly under the usual conditions of government than the gate of another wheel, with the result that one wheel will carry a larger proportion of the load than another wheel, and whatever the number of wheels may be, and whatever the differences of resistance in the gate mechanism may be, the motion of the gates in every wheel, will, as a general rule, differ from the motion of the gate in every other wheel. The object of this mechanism is to cause each wheel to carry its proportion of the load. This result is accomplished through the medium of the one constant element in the combination. The constant element is the uniform motion of the governor heads with every drop or acceleration of speed, that is to say, each governor head will be affected the same proportionate amount for every change of speed. The main valve by which power is admitted to the mechanism which moves the gate is controlled directly by the motion of the governor head. In each governor of a series all running at the same speed, operating upon the same line, the rise or fall of each head will be uniform, and the motion of each valve will be uniform and the influence of the gate moving mechanism upon each gate would be uniform if the pressure upon and resistance of each gate were the same; but the resistance of each gate differs and therefore the very evil which it is desired to overcome would not be overcome unless some additional means be introduced to cause the valve of the gate controlling mechanism to be moved independently of the motion of the governor heads. I employ a mechanism by which the actual motion of each gate is caused to exert an influence upon its valve and its moving mechanism, so as to cause that valve to occupy a position dependent upon the position of the gate, as well as the position of the governor head, and by this means the valves are caused to open and close in correspondence with the two causes acting upon them, one the motion of the governor head due to the direct rise or fall of speed, and the other the actual motion of the gate. By the combination of these two means both operating upon the valve, the valve is caused to occupy a position which is the resultant of the two influences, the position of the governor head and the position of the gate. The motions of the governor heads in a series must necessarily be proportionate; consequently the influence of the governor head upon the gate in each case will be a proportionate influence. The element which fluctuates is the position of the gate; hence the position of the valve is made to depend directly upon the position of the gate, and therefore the valve is opened or closed as the gate moves too far or not far enough, as the case may be. If one gate moves ahead of the other, its excessive motion will cause its valve to close until the other gate has caught up; or if one gate has moved much too far and the speed of the wheel begins to come up above normal before the second gate has caught up with the first one, then the first one which has moved too far will begin to move again in an opposite direction from the gate of the other wheel until they come to a uniform position. The mechanism by which this result is accomplished is shown in Figs. 4, 5, 6, 9, 13, and 14 and in Diagrams 28 to 37.

By reference to Figs. 1 and 21 it will be seen that the motion of the gate is communicated positively to the rod 12 and thence to the cam 37, and to the rod 125 which is connected at its upper end to the arm 128, secured to the rock shaft 129, shown in Fig. 14. Upon the rock-shaft 129 is also secured an arm 180, which is provided with a slot at 181. 182 is a rod provided with a slotted arm 183. 184 is a bolt, secured in the slot of the arm 180, and passing through the slot of the arm 183. The location of the bolt 184 in the slots of the arms 180 and 183 will determine the amount of vertical motion which will be communicated to the rod 182. The motion of the rod 125, which is actuated directly from the gate, will be communicated to the rod 182, and will cause it to move in correspondence with the gate.

Referring now to Fig. 4, it will be seen that the rod 182 is connected at its upper end to a crank 185 which is secured upon the end of a rock shaft 186 (Fig. 5) which passes through and is journaled in the stationary arm 98. On the opposite end of the rock shaft 186 is a crank 187 (Figs. 5 and 6) to the end of which is secured a link 188, the other end of which is secured to the center pin which unites the links 99 and 100 and 101 and 102 (Fig. 9). It will be remembered that the links 99 and 100 are pivotally connected at their lower ends to the stationary arm 98, and that the links 101 and 102 are pivotally connected at their upper ends to the main valve lever 103. The main valve lever is pivoted upon the trunnions 104—104 and therefore as the points of union of the links 99 and 101, and 100 and 102 are drawn back and forward by the motion of the link 188 under the influence of the rod 182 and the gate, the lever 103 will be moved upon its trunnions 104—104 and the main valve, which is connected to the opposite end of the lever 103, will be moved. The position of the links shown in Figs. 4, 5, 6, and 9 show the position of those links when the gate is closed. The position shown in dotted line in Fig. 6 is the position of the links when the gate is partly open, say half open. The positions which would be occupied by the links for anything less than fifty per cent gate, or anything more than fifty per cent gate, would correspond to the positions indicated in Fig. 6. It will be understood that the links will always occupy a definite position for any particular gateage;

they are parallel when the gate is closed; they have their greatest angle to one another when the gate is wide open, and they occupy intermediate positions for every intermediate position of the gate. As the links change their relative position with the change of gate, the point of attachment of the upper links 101 and 102 to the lever 103 will change its relation to the point of attachment of the links 99 and 100 to the stationary arm 98. These two points of attachment have been numbered for the sake of convenience 191 and 190. The point 190 is always stationary; the point 191 is always approaching or receding from the point 190 with every change in the position of the gate. The trunnion centers 104—104 become a fulcrum upon which the lever 103 is moved as the links move, and as the point 191 rises and falls. The opposite end of the lever 103 moves reversely and raises or lowers the valve rod 108. When the gate is stationary, the point 191 is stationary, and as the speed fluctuates, the point 104 will be raised and lowered by the governor head converting the lever 103 into a lever of the second kind, but moving the valve rod 108 in an opposite direction to the motion imparted to it by the motion of the gate.

Heretofore I have stated and explained the mechanism by which the wheel is caused to return to the exact speed after a change of load and speed has occurred. In this device, I do not bring my wheel back to exact speed, but I hold it off speed, fluctuating the speed slightly for the purpose of securing the uniform position of gates.

Referring to Diagrams 28 to 37, I have shown diagrammatically the governor head with four positions for the center of its trunnions 104—104. Those four positions correspond to four speeds which, for the purpose of example I have roughly called 100 revolutions, 99 revolutions, 98 revolutions and 97 revolutions. In practice the variation of speed necessary to accomplish the result desired is much less than that indicated by the example, but for the purpose of convenience I have adopted these figures.

Referring to Fig. 28, 192 represents the governor head. 193 represents the main valve chest, 194 the main valve, 195 the pressure inlet, 196 the exhaust. 197 is a line which represents the main valve stem. 198 is the cylinder containing the piston for regulating the gate. 199 and 200 are the ports by which the pressure is exhausted from the cylinder 198 to the valve chest 193. 201 is the piston reciprocating in the cylinder 198. 202 is a line representing the piston rod. The series of lines passing through the point 104 represent various positions of the governor lever 103. For the purpose of illustration, the governor lever is divided into two equal parts. The governor head is connected to it at its center. The main valve stem 197 is connected to it at one end and the rod 202 which is connected to the piston is connected to the lever 103 at the other end. The intervening mechanism by which the motion of the gate is reduced and communicated to the lever 103, at the point 191, is all eliminated in an effort to make clear the principles of the operation. Positions for the right hand end of the lever 103 are indicated by $1-$, 0, $1+$, $2+$, $3+$. These are the positions which will be occupied by the right hand end of the governor lever under varying conditions of position in the governor head and the point 104. The position occupied by the right hand end of the lever 103 will determine the position of the valve 194, and this will determine the direction in which the piston 201 will move. The positions of the left hand end of the lever, that is to say, the positions which would correspond with the positions occupied by the point 191 are represented by $a^0, a^1, a^2, a^3$. $a^0$ is taken to represent fifty per cent gate, $a^1$ sixty per cent gate, $a^2$ seventy per cent gate, $a^3$ eighty per cent gate. Fig. 29 represents an identical position for all of the parts. These two figures represent the wheels as running at one hundred revolutions under a constant load at fifty per cent gate. The valve is closed, the gate is stationary, and the point 104 is also stationary so far as any fluctuations due to change of speed are concerned.

Figs. 30 and 31 represent identical parts, but not identical positions. The change has occurred from the positions shown in Figs. 28 and 29; an added load has come on, a drop of speed has occurred from one hundred revolutions to ninety seven revolutions, and each head has correspondingly dropped from the position for the point 104 representing one hundred revolutions to the position for that point representing 97 revolutions. This change of speed has taken place before any motion of the gate could occur; consequently the point 191, in the combination of movement has been stationary, but the right hand end of the lever 103 has been thrown down from position marked zero to the position marked $3+$. This has moved the main valves in each case so that the upper ports of the cylinders 198—198 are open to pressure. The opposite ends of the cylinders are being exhausted. Figs. 32 and 33 represent identical parts, but in different positions. As soon as the positions shown in Figs. 30 and 31 were established, the pistons 201—201 began to move, and they moved, the pressure being uniform, at a speed and for a distance represented by their individual frictional resistance to the power applied. One of them would have a greater amount of frictional resistance than the other, and would move more slowly than the other, and a less distance in the same time.

In the Diagram 32, I have shown the piston as having traveled under the influence of pressure applied to it to a position of eighty per cent gate, while the piston shown in Fig. 33 has traveled only to a position represented by sixty per cent gate. Now the heads are uniform, and until the speed changes they will occupy the same positions as shown in Figs. 30 and 31, that is to say, a position corresponding with 97 revolutions. The points 104—104, therefore, so long as the heads remain in the position representing ninety-seven revolutions, will be stationary, and the levers 103—103 will be moved upon those points as fulcrums by the motion of the gates. Now the gate in Fig. 32 has moved to a point of eighty per cent, while the gate in Fig. 33 has moved only to a point of sixty per cent; consequently the opposite ends of the levers 103—103 have moved correspondingly. The right hand end of the lever in Fig. 32 has gone up to the zero point, and represents a closed valve, and the gate has been stopped at eighty per cent. The right hand end of the lever in Fig. 33 has, however, gone up so far as the point indicated by 2+, in which position the valve still continues open. Pressure is still applied to the upper side of the piston 201 and exhausting from the lower side, and the piston is still moving, and the gate still opening. Thus we have one gate which has reached an opening of eighty per cent, and stationary, the other gate having reached an opening of sixty per cent, but continuing to move, because its valve is still open. With the valves of the gates in these relative positions, speed begins to build up, and before the gates reach speed position, the governor heads have been raised by an acceleration of speed, so that the points 104—104 have risen from the position representing ninety seven revolutions to the position representing ninety-eight revolutions. This action has taken place before the gates could move further, and consequently, considering the points 191—191 as stationary in the position shown in Figs. 32 and 33, which are eighty per cent for one gate, and sixty per cent for the other gate, the right hand end of the lever 103 will be drawn up by the head in Fig. 34 to a position represented by 1—, which will have caused the valve to move up past the ports and begin to exhaust the upper end of the cylinder while supplying pressure to the lower end. By this means the gate of the wheel shown in Fig. 33 will begin to close. The motion of the governor head, however, in Fig. 35 from the position representing ninety-seven revolutions to the position representing ninety-eight revolutions has moved the lever 103 upward; but it has carried the right hand end of that lever only up to the position marked 1+, which is a position in which the upper port of the cylinder is still open to pressure, the lower one open to exhaust, and the gate of that wheel is opening. We therefore have in those two figures a representation of the conditions which would exist where the heads had moved, uniformly and together, but the gates of the two wheels were moving in opposite directions, one to close, the other to open, in an effort to get together.

Figs. 36 and 37 illustrate a position of the parts in which the speed has now been built up to ninety-nine revolutions, and the points 104—104 of each head have risen to a position corresponding with ninety-nine revolutions. While this motion was taking place, the gate of the first wheel has been closing and has come to a point of sixty per cent and has come to a point of sixty per cent gateage, the gate of the second wheel having in the meantime stood still at sixty per cent gateage; the right hand end of the levers 103—103 in each case will now be in the position indicated by zero, both valves will be closed and both gates stationary.

Comparing, now, the Figs. 28 and 29 with the Figs. 36 and 37, it will be seen that the governor heads in these two pairs of figures occupy different positions. In one the position is that represented by one hundred revolutions, in the other it is that represented by ninety-nine revolutions. The gates also differ. In one the gates are fifty per cent. open, in the other the gates are sixty per cent. open, but in both cases the valves may come to the same point, i. e. closed, and the right hand ends of the levers 103—103 have come to the zero position which represents closed. It will be understood, therefore, that if this form of construction is to be used for the purpose of producing uniform motion of the gates in two wheels, the stationary conditions of the gates being accomplished by holding the valves over the ports, so as to admit no excessive pressure on one side or the other of the gate moving mechanism, the governor head must be moved correspondingly with the gate. The variation of speed which is to be permitted to accomplish this movement is very slight, so slight as to be immaterial in the actual operation of government. In every particular installation, there is an average load; this average is taken as the point for which the governors and other parts will be set for the speed desired, and in order to accomplish uniform movement of the gates, the speed will be allowed to drop slightly below that normal speed as the gates open to accommodate a load greater than the usual average load. By this means, I am able to cause the gates of any number of wheels, operating any number of generators, to move in unison with one another, so that every wheel will do its proportion of the work.

If the governors of two motors are caused to respond to the speed of the motors, as well as the load being carried by them, and either of these elements be maintained constant, the other may be maintained relatively uniform. If two motors of any kind are carrying together the same load, it will not matter what the size of each motor or the speed of each motor may be, each can be caused to carry its proper proportion of the load. With every change of load, there will be a corresponding change of speed, and this change of speed will be imparted to each governor no matter what its construction or speed. Each drops with an added load a corresponding amount, and this drop will bear a constant relation to other conditions, so that whether both governors be of the same construction or different, whether the motors be of the same character or different, they will behave as if they were identical and were running at the same speed, as in the example given above. So, also, if the motors be different in size or type, they will both act as if they were identical so far as dividing the load is concerned, and the controller of the motor by which it is caused to respond to fluctuations of load can be caused to influence the governor in the same general may as the gate mechanism in the example above is caused to influence the governor. The principle being that the governor shall respond to changes of load as well as changes of speed, and as the relative position of the governors may be caused to operate the motor controller admitting power to the motor until the controller of each motor occupies a position uniform in relation to the other one.

The mechanism which has been described in this case is a form in which I have embodied my inventions to put them into practical use, but it is by no means necessary that the same form of construction should be used whenever the inventions are to be applied. Many different forms of construction might be used which would carry my inventions into effect.

I believe it to be broadly new with me to cushion the motion of the gate so as to cause it to move rapidly when it is desired that it should move rapidly, and move slowly when it is desired that it should move slowly, also to permit a rapid motion of the gate in opening with a suddenly added load, at the time when the gate is partially closed, also giving to the gate a step by step motion in the direction in which it is desired it should be moved, so as to permit the water admitted to become effective upon the runner and build up the speed or permit the speed to drop before the gate is given another impulse. Also the regulation of the length and interval of these steps so as to correspond with the fluctuations of load. Also the bringing of the wheel to exact speed while the governing and maintaining it at exact speed, and yet in condition, active and ready to respond to the slightest change of load without the necessity of holding the wheel off of speed in order to maintain it in a condition in which it will respond to a change of load. I believe it to be also new with me to eliminate the resistance offered to a change of speed by inertia, momentum, and friction, and to set the apparatus free from these drags upon its theoretical activity and permit it to respond to the slightest change of speed to produce a corresponding change of gate. I believe it to be also new to throw upon the gate moving mechanism, as well as the centrifugal governor, a constant artificial and independent oscillation, by which all of the parts are kept in a state of constant activity swinging back and forth through a short path and thus maintaining them in readiness to accept and move in correspondence with any impulse which may be given to them for the purpose of government.

It is new to cause the gates of two wheels to move uniformly with one another by causing the governor heads which are moving in unison to co-operate with the motions of the gates to open or close the actuating valves in such succession and relation as to compel the gates to find a state of rest in uniformity with one another, and cause each to carry its proportion of the load.

In the governors for prime motors for turbine water wheels as heretofore devised, it has been the universal practice to so operate the motor controller of a gate as to cause the velocity of government to be uniform, and the amount of government to depend upon the period during which the motor controller is operated. Thus in a turbine water wheel, whether in so-called mechanical governors, or of so-called hydraulic governors, the operation of government consists in moving the gate at a uniform speed for all changes of load, but for varying periods of time dependent upon the changes of load. In my governor, I employ a different principle. I cause the motor controller, or, in the case of a turbine water wheel, the gate, to move at a speed which corresponds to the amount of the change of load. If the change of load is slight, the gate moves slowly, if the change of load is great, the gate moves rapidly. By this means I accomplish quick regulation and give to my apparatus a capacity for promptly following changes of load and speed, which makes it very effective as a governing device. It will be remembered that the motion of the gate is dependent upon the co-operation of two valves, the main valve and the exhaust valve. Now the main valve controls both inlet and exhaust, and this control is to some extent dependent and to some extent independent of the exhaust valve. It is dependent upon the exhaust valve when the aperture of the exhaust valve is less than the aperture of exhaust created by the main valve. It is independent of the exhaust valve when the aperture of the exhaust valve is greater than the aperture to exhaust of the main valve. Thus it will be seen that when the wheel is running at speed, no matter what the position of the exhaust valve may be dependent upon the position of the gate, the main valve covering the ports of both inlet and exhaust and leaving only a minute aperture for the maintenance of suitable pressure, the main valve will, with slight changes of speed, admit and exhaust pressure but slowly to and from the cylinder; hence no matter what the position of the exhaust valve may be the motion of the main valve and of the gate must be slight. With a sudden rise or fall of the main valve, the exhaust port and the pressure port may be opened wide, and if the exhaust valve be not open wide enough to permit the rapid exhaust sufficient to give the desired rapidity of government, the relief valve will be opened and the exhaust valve thrown still further open so that a quick motion of government may occur. As the speed comes back to normal, the main valve will again be restored to position over its ports, and the exhaust port will be gradually closed. Thus we will have a slow rise or velocity of government at the start, a rapid movement at the maximum proportionate to the maximum change of speed, and a slowing down of the speed of government as the wheel approaches speed. This order of operations is interrupted to some extent by the intermittent closing of the main valve under the influence of the auxiliary oscillating and stepping mechanisms, but for every step which does take place the operation is the same, a gradual rise and fall of velocity.

Having thus described my invention, what I claim and desire to secure by Letters Patent is:

1. The combination of a piston contained in a cylinder balanced between active opposing pressures, a main valve controlling inlet and exhaust from the cylinder, an independent exhaust valve, means connected to and operating the main valve and means connecting the exhaust valve with the piston, including a cam by which the motion of the piston is reduced and communicated to the exhaust valve in a relation corresponding to the curve of efficiency of the prime motor.

2. In a synchronizing device for two or more prime motors, the combination of two independent governors driven from the motors, two motor controllers, each consisting of a piston balanced between active opposing pressure, and moving in a cylinder, a main valve for each cylinder, admitting and exhausting pressure to and from the cylinder, a lever for each governor pivoted at or about its center to the base of the governor, and moved by its pivot by the governor, means connecting the main valve to one end of the lever, and means connecting the piston to the other end of the lever.

3. In a synchronizing device for turbine water motors operating electric generators which are feeding a common line, two wheels, gate-moving mechanism, a controller for the gate-moving mechanism, two governors driven from the wheels means connecting the governor to the controllers, so that they will respond to the motion of the governor, independent means connecting the controller to the gate and by which it is moved in an opposite direction to the motion communicated to it by the governor, the ultimate motion of the controller being the resultant of the motions of the governor and gate.

4. In a device for causing two motors carrying the same load to divide it in proportion to their capacity, the combination of two motors carrying a common load, a governor for each motor, means connecting each motor to its governor by which the speed of the motor is communicated to the governor, means connecting each motor to its governor by which the proportion of power being developed by the motor is communicated to the governor, a motor controller operated by the governor, the motion of the controller being the resultant of the speed and load, both of which are influencing the governor.

5. In a device for causing two motors carrying the same load to divide it in proportion to their capacity, the combination of two motors, carrying a common load, a governor for each motor, means communicating the speed of each motor to its governor, means communicating the proportion of the load being carried by each motor to its governor, a motor controller for each motor, each controlled by its own governor, the motion of each controller being the resultant of speed and load of each motor.

6. In a synchronizing device for turbine water wheels, a series of wheels, each controlled by a gate and means for giving to the wheels at every position of gate a different normal speed.

7. In a synchronizing device for prime motors a series of motors each controlled by a controller and means for giving to the motors at every position of the controller a different normal speed.

8. In a device for governing a prime motor, the combination of a governor, a controller, and means for changing the normal speed position of the governor as the power of the motor changes.

9. In a device for governing a prime motor the combination of a governor, a controller, and a motor, and means for changing the normal speed of the governor inversely as the power changes.

10. In a device for governing a prime motor the combination of a centrifugal governor, a controller, and a motor, and means for changing the normal path of the centrifugal device independently of speed.

Signed by me at Baltimore city, State of Maryland, this 3 day of July, 1906.

FRANCIS ELLICOTT.

Witnesses:
ARMSTEAD M. WEBB,
WILLIAM W. POWELL.